US012592086B2

(12) United States Patent
Ge et al.

(10) Patent No.: US 12,592,086 B2
(45) Date of Patent: Mar. 31, 2026

(54) POSE DETERMINING METHOD AND RELATED DEVICE

(71) Applicant: HUAWEI TECHNOLOGIES CO., LTD., Shenzhen (CN)

(72) Inventors: Jiange Ge, Shenzhen (CN); Zeying Xu, Shenzhen (CN); Zongwu Wu, Shenzhen (CN); Mu Liu, Dongguan (CN); Meng Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 445 days.

(21) Appl. No.: 17/896,167

(22) Filed: Aug. 26, 2022

(65) Prior Publication Data

US 2023/0005277 A1     Jan. 5, 2023

Related U.S. Application Data

(63) Continuation of application No. PCT/CN2021/078328, filed on Feb. 27, 2021.

(30) Foreign Application Priority Data

Feb. 27, 2020     (CN) .......................... 202010124227.2

(51) Int. Cl.
G06T 7/73          (2017.01)
G06V 10/24        (2022.01)
G06V 20/58        (2022.01)

(52) U.S. Cl.
CPC .............. G06V 20/586 (2022.01); G06T 7/73 (2017.01); G06V 10/24 (2022.01); G06T 2207/30204 (2013.01); G06T 2207/30264 (2013.01)

(58) Field of Classification Search
CPC ....................................................... G06T 7/73
See application file for complete search history.

(56) References Cited

U.S. PATENT DOCUMENTS 8,300,889 B2     10/2012  Jung
2015/0142248 A1*  5/2015  Han ................... G01C 21/3602
                                                                701/23

(Continued)

FOREIGN PATENT DOCUMENTS

CN          105637321 A      6/2016
CN          106683473 A      5/2017

(Continued)

OTHER PUBLICATIONS

International Search Report dated Jun. 2, 2021 issued for International Application No. PCT/CN2021/078328 (12 pages).

(Continued)

*Primary Examiner* — Ian L Lemieux

(57)          ABSTRACT

A pose determining method, which may be applied to the field of photographing and image processing, includes: obtaining a target image, where the target image includes a target parking space mark and a target parking space line, and a target parking space corresponding to the target parking space mark includes the target parking space line; and determining pose information based on the target parking space mark and the target parking space line. The pose information indicates a corresponding pose of a terminal during photographing of the target image. According to the pose determining method, the pose information may be determined based on the target parking space mark and the target parking space line, to implement positioning.

20 Claims, 20 Drawing Sheets

(56)                References Cited

U.S. PATENT DOCUMENTS

| | | | |
|---|---|---|---|
| 2016/0265919 A1* | 9/2016 | Schuller | G01C 21/3602 |
| 2017/0076603 A1* | 3/2017 | Bostick | B62D 15/0285 |
| 2018/0232583 A1* | 8/2018 | Wang | G06V 10/82 |
| 2019/0370997 A1 | 12/2019 | Hou et al. | |
| 2019/0385330 A1 | 12/2019 | Bachhuber et al. | |
| 2020/0132473 A1* | 4/2020 | Shipley | G01C 21/1652 |
| 2020/0258388 A1* | 8/2020 | Nakka | G08G 1/143 |
| 2020/0294310 A1* | 9/2020 | Lee | G06V 10/82 |
| 2020/0361462 A1* | 11/2020 | Noguchi | G08G 1/22 |
| 2021/0224562 A1* | 7/2021 | Zhan | G06V 20/58 |
| 2022/0084299 A1* | 3/2022 | Han | G06F 3/04845 |
| 2022/0392329 A1* | 12/2022 | Chu | G08G 1/0175 |
| 2025/0214567 A1* | 7/2025 | Park | G06V 30/224 |

FOREIGN PATENT DOCUMENTS

| | | | | |
|---|---|---|---|---|
| CN | 108090435 | A | 5/2018 | |
| CN | 104748738 | B | 6/2018 | |
| CN | 108166821 | A | 6/2018 | |
| CN | 108275147 | A | 7/2018 | |
| CN | 108537845 | A | 9/2018 | |
| CN | 109003305 | A | 12/2018 | |
| CN | 109817018 | A | 5/2019 | |
| CN | 109887033 | A | 6/2019 | |
| CN | 109948591 | A | 6/2019 | |
| CN | 110136199 | A | 8/2019 | |
| CN | 110264520 | A | 9/2019 | |
| CN | 110378962 | A | 10/2019 | |
| CN | 110727009 | A | 1/2020 | |
| CN | 110794955 | A | 2/2020 | |
| CN | 110136199 | B * | 9/2022 | G01C 21/165 |

OTHER PUBLICATIONS

Office Action dated Jan. 26, 2022 issued for Chinese Application No. 202010124227.2 (14 pages).

* cited by examiner

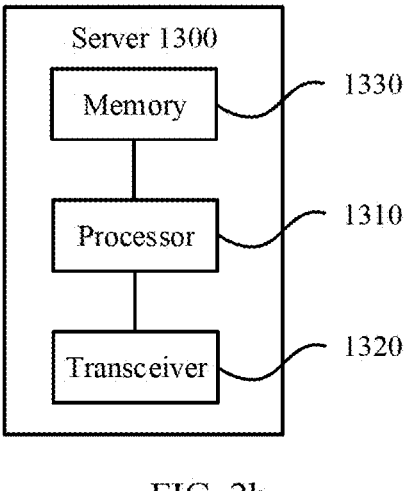

FIG. 2b

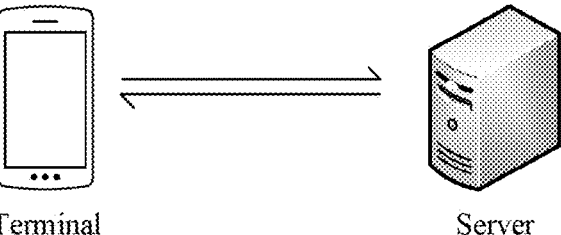

Terminal                    Server

FIG. 2c

Obtain a target image, where the target image includes a target parking space mark and a target parking space line, and a target parking space corresponding to the target parking space mark includes the target parking space line          301

Determine pose information based on the target parking space mark and the target parking space line, where the pose information indicates a corresponding pose of a terminal during photographing of the target image          302

FIG. 3

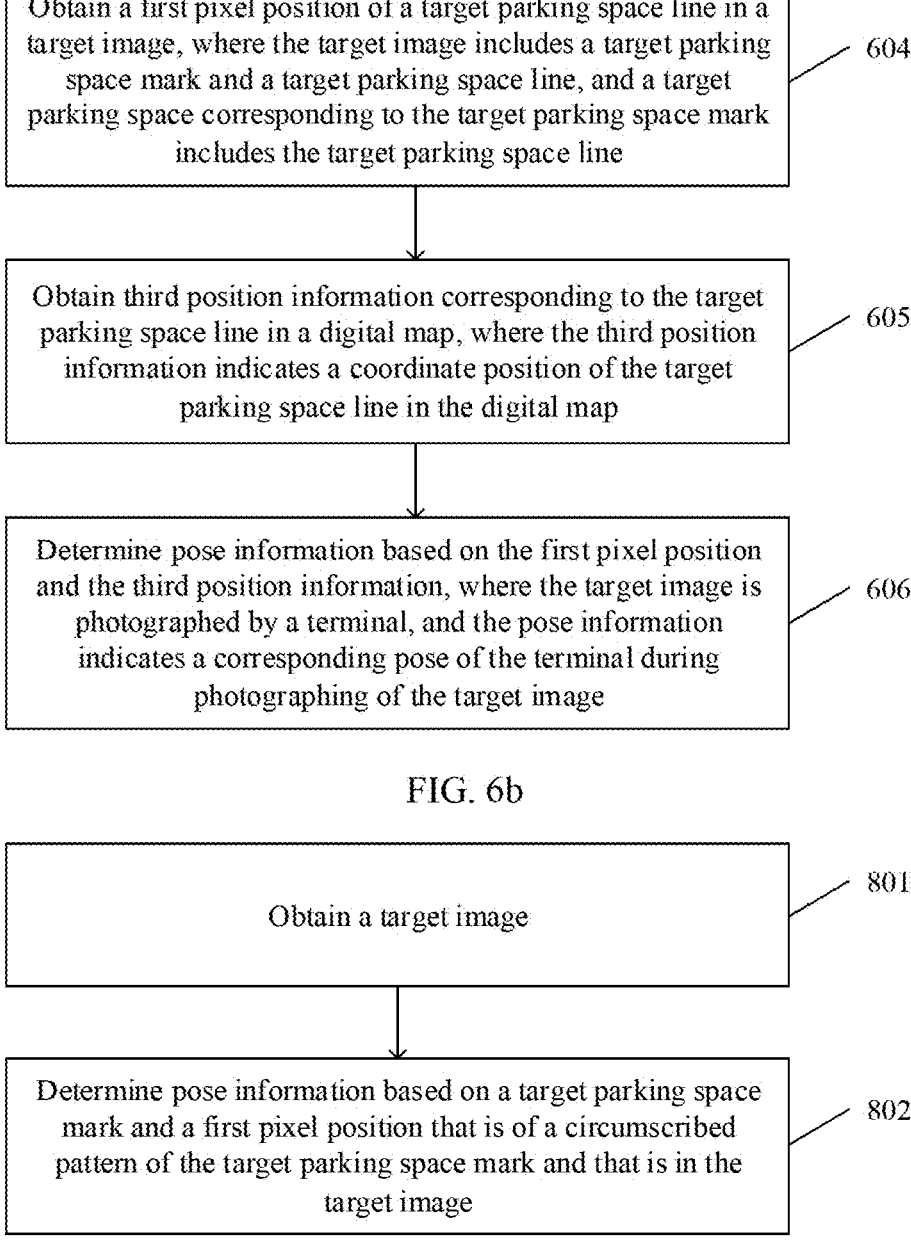

Obtain a first pixel position of a target parking space line in a target image, where the target image includes a target parking space mark and a target parking space line, and a target parking space corresponding to the target parking space mark includes the target parking space line — 604

Obtain third position information corresponding to the target parking space line in a digital map, where the third position information indicates a coordinate position of the target parking space line in the digital map — 605

Determine pose information based on the first pixel position and the third position information, where the target image is photographed by a terminal, and the pose information indicates a corresponding pose of the terminal during photographing of the target image — 606

FIG. 6b

Obtain a target image — 801

Determine pose information based on a target parking space mark and a first pixel position that is of a circumscribed pattern of the target parking space mark and that is in the target image — 802

FIG. 7a

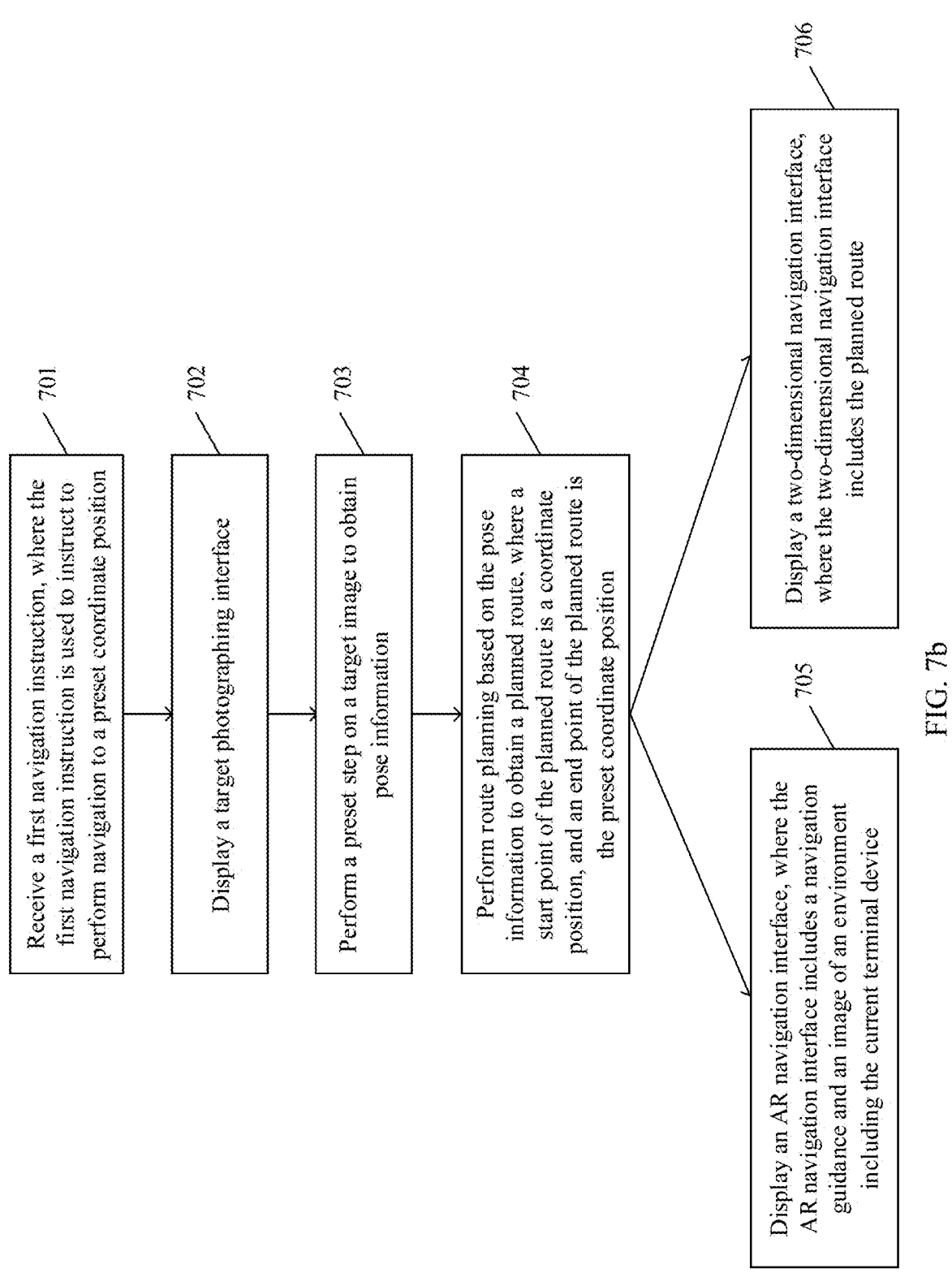

701 — Receive a first navigation instruction, where the first navigation instruction is used to instruct to perform navigation to a preset coordinate position 702 — Display a target photographing interface 703 — Perform a preset step on a target image to obtain pose information 704 — Perform route planning based on the pose information to obtain a planned route, where a start point of the planned route is a coordinate position, and an end point of the planned route is the preset coordinate position 705 — Display an AR navigation interface, where the AR navigation interface includes a navigation guidance and an image of an environment including the current terminal device 706 — Display a two-dimensional navigation interface, where the two-dimensional navigation interface includes the planned route

FIG. 7b

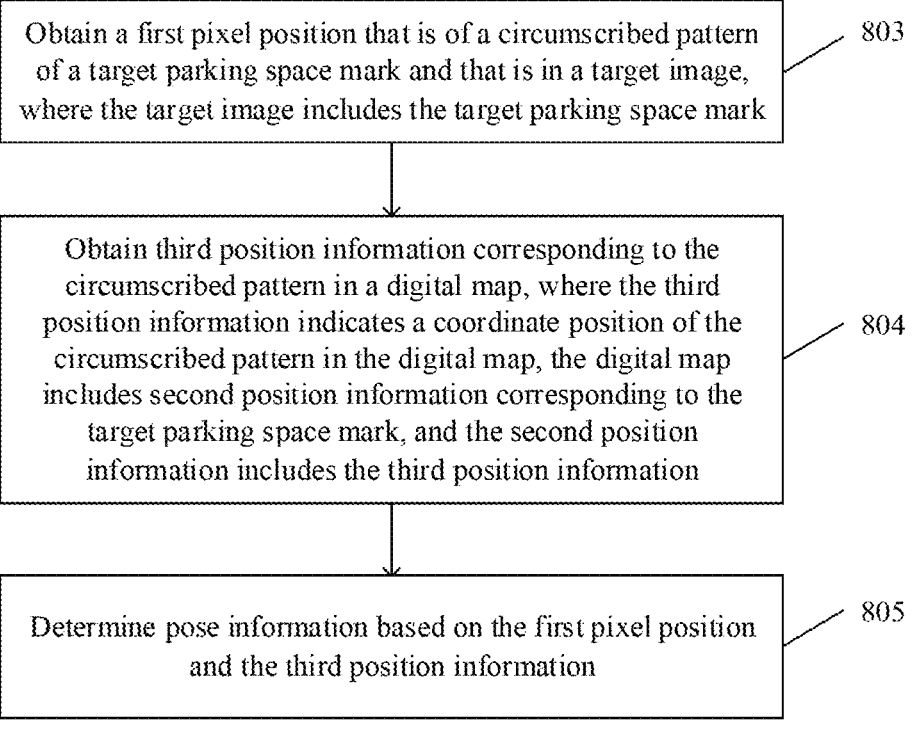

Obtain a first pixel position that is of a circumscribed pattern of a target parking space mark and that is in a target image, where the target image includes the target parking space mark ⟋ 803

Obtain third position information corresponding to the circumscribed pattern in a digital map, where the third position information indicates a coordinate position of the circumscribed pattern in the digital map, the digital map includes second position information corresponding to the target parking space mark, and the second position information includes the third position information ⟋ 804

Determine pose information based on the first pixel position and the third position information ⟋ 805

FIG. 8e

POSE DETERMINING METHOD AND RELATED DEVICE

CROSS-REFERENCE TO RELATED APPLICATIONS

This application is a continuation of International Application No. PCT/CN2021/078328, filed on Feb. 27, 2021, which claims priority to Chinese Patent Application No. 202010124227.2, filed on Feb. 27, 2020. The disclosures of the aforementioned applications are hereby incorporated by reference in their entireties.

TECHNICAL FIELD

This disclosure relates to the image processing field, and in particular, to a pose determining method and a related device.

BACKGROUND

Navigation belongs to a basic requirement of people's daily life. Map manufacturers have already launched a mature outdoor 2D navigation function that relies on a global positioning system (GPS). However, because there is usually no GPS signal indoors, it is still difficult to provide accurate navigation in an indoor scenario.

With development of computer vision, the academia and the industry are trying to use a visual method for positioning. A real world environment is scanned in advance and a 3D point cloud map is built. For each 2D feature point in an image, distances between a descriptor of the 2D feature point and descriptors of all (or a part of) feature points in a point cloud are calculated to perform 2D-3D feature point matching, and a pose of a terminal device on the 3D point cloud map during image photographing is calculated based on a pose calculation algorithm.

As there are more drivers, navigation in an underground garage also becomes users' important requirement. However, in a scenario of the underground garage in which visual features are repeated and textures are not rich, a success rate of a positioning manner based on a 3D point cloud map is very low.

SUMMARY

This disclosure provides a pose determining method, to determine pose information based on a target parking space mark and a target parking space line when positioning accuracy of a GPS signal is poor, thereby implementing positioning.

According to a first aspect, this disclosure provides a pose determining method, where the method includes:

obtaining a target image, where the target image includes a target parking space mark and a target parking space line, and a target parking space corresponding to the target parking space mark includes the target parking space line; and determining pose information based on the target parking space mark and the target parking space line, where the pose information indicates a corresponding pose of a terminal during photographing of the target image.

Optionally, in a design of the first aspect, the determining pose information based on the target parking space mark and the target parking space line includes:

obtaining a first pixel position of the target parking space line in the target image;

obtaining third position information corresponding to the target parking space line in a digital map, where the third position information indicates a position of the target parking space line in the digital map; and determining the pose information based on the first pixel position and the third position information.

Optionally, in a design of the first aspect, the determining pose information based on the target parking space mark and the target parking space line includes:

sending the target image to a server; and receiving the pose information sent by the server, where the pose information is determined by the server based on a first pixel position of the target parking space line in the target image and third position information corresponding to the target parking space line in a digital map, and the third position information indicates a position of the target parking space line in the digital map.

Optionally, in a design of the first aspect, the determining pose information based on the target parking space mark and the target parking space line includes:

obtaining a first pixel position of the target parking space line in the target image;

sending the target parking space mark and the first pixel position to a server; and receiving the pose information sent by the server, where the pose information is determined by the server based on the first pixel position and third position information corresponding to the target parking space line in a digital map, and the third position information indicates a position of the target parking space line in the digital map.

Optionally, in a design of the first aspect, the determining pose information based on the target parking space mark and the target parking space line includes:

obtaining third position information corresponding to the target parking space line in a digital map, where the third position information indicates position information of the target parking space line in the digital map;

sending the target image and the third position information to a server; and receiving the pose information sent by the server, where the pose information is determined by the server based on the third position information and a first pixel position of the target parking space line in the target image.

Optionally, in a design of the first aspect, the obtaining a target image includes:

displaying a target photographing interface, where the target photographing interface includes a photographing area, and the photographing area includes a preset guide contour; and obtaining, through photographing, the target image if the target parking space in the photographing area is located within the preset guide contour or a position difference between a target parking space in the photographing area and the preset guide contour falls within a preset range.

Optionally, in a design of the first aspect, before the determining pose information based on the target parking space mark and the target parking space line, the method further includes:

displaying a parking space mark input indication box in the target image; and obtaining the target parking space mark input in the parking space mark input indication box.

Optionally, in a design of the first aspect, the pose information includes a coordinate position of the terminal device during photographing of the target image.

The method further includes:

performing route planning based on the coordinate position to obtain a planned route, where a start point or an end point of the planned route is the coordinate position; and displaying a two-dimensional navigation interface, where the two-dimensional navigation interface includes the planned route.

Optionally, in a design of the first aspect, the pose information includes a coordinate position, a yaw angle, a pitch angle, and a roll angle of the terminal device during photographing of the target image; and the method further includes:

displaying an AR navigation interface, where the AR navigation interface includes a navigation guidance and an image of an environment including the current terminal device, and the navigation guidance is determined based on the coordinate position, the yaw angle, the pitch angle, and the roll angle of the terminal device.

Optionally, in a design of the first aspect, the obtaining third position information corresponding to the target parking space line in a digital map includes:

obtaining positioning information of the terminal device during photographing of the target image; and obtaining, from the digital map, the third position information that matches the positioning information and that corresponds to the target parking space line in the digital map.

Optionally, in a design of the first aspect, the target parking space line includes a first parking space line, a second parking space line, and a third parking space line. At least two of the first parking space line, the second parking space line, and the third parking space line are not parallel in the digital map, and a first corner point is an intersection point of the first parking space line and the second parking space line.

The first pixel position includes direction information of the first parking space line, the second parking space line, and the third parking space line in the target image, and the third position information includes preset directions corresponding to the first parking space line, the second parking space line, and the third parking space line in the digital map; or the first pixel position includes direction information of the first parking space line and the second parking space line in the target image, and a pixel position of the first corner point in the target image; and the third position information includes preset directions corresponding to the first parking space line and the second parking space line in the digital map, and a preset position corresponding to the first corner point in the digital map.

Optionally, in a design of the first aspect, the method further includes:

obtaining a gravity direction of the terminal device during photographing of the target image; and the determining the pose information based on the first pixel position and the third position information includes:

determining the pose information based on the first pixel position, the third position information, and the gravity direction.

Optionally, in a design of the first aspect, the determining the pose information based on the first pixel position and the third position information includes:

determining a 2D-3D correspondence between the first pixel position and the third position information, where the 2D-3D correspondence indicates a correspondence between two-dimensional coordinates of the target parking space line in the target image and three-dimensional coordinates of the target parking space line in actual space; and determining the pose information based on the 2D-3D correspondence.

According to a second aspect, this disclosure provides a pose determining method. The method includes:

obtaining a first pixel position of a target parking space line in a target image, where the target image includes a target parking space mark and a target parking space line, and a target parking space corresponding to the target parking space mark includes the target parking space line;

obtaining third position information corresponding to the target parking space line in a digital map, where the third position information indicates a coordinate position of the target parking space line in the digital map; and determining pose information based on the first pixel position and the third position information, where the pose information indicates a corresponding pose of a terminal during photographing of the target image.

Optionally, in a design of the second aspect, the obtaining a first pixel position of a target parking space line in a target image includes:

receiving the target image sent by the terminal device; and determining the first pixel position of the target parking space line in the target image.

Optionally, in a design of the second aspect, the obtaining a first pixel position of a target parking space line in a target image includes:

receiving the first pixel position that is of the target parking space line in the target image and that is sent by the terminal device.

Optionally, in a design of the second aspect, the obtaining third position information corresponding to the target parking space line in a digital map includes:

receiving the target image or the target parking space mark sent by the terminal device; and determining, from the digital map, the third position information corresponding to the target parking space line.

Optionally, in a design of the second aspect, the obtaining third position information corresponding to the target parking space line in a digital map includes:

receiving the third position information that corresponds to the target parking space line in the digital map and that is sent by the terminal device.

Optionally, in a design of the second aspect, the target parking space line includes a first parking space line, a second parking space line, and a third parking space line. At least two of the first parking space line, the second parking space line, and the third parking space line are not parallel in the digital map, and a first corner point is an intersection point of the first parking space line and the second parking space line. The first pixel position includes direction information of the first parking space line, the second parking space line, and the third parking space line in the target image, and the third position information includes preset directions corresponding to the first parking space line, the second parking space line, and the third parking space line in the digital map; or the first pixel position includes direction information of the first parking space line and the second parking space line in the target image, and a pixel position of the first corner point in the target image; and the third position information includes preset directions corresponding to the first parking space line and the second parking space line in the digital map, and a preset position corresponding to the first corner point in the digital map.

Optionally, in a design of the second aspect, the method further includes:

receiving a gravity direction that is of the terminal device during photographing of the target image and that is sent by the terminal device; and the determining pose information based on the first pixel position and the third position information includes:

determining the pose information based on the first pixel position, the third position information, and the gravity direction.

Optionally, in a design of the second aspect, the determining pose information based on the first pixel position and the third position information includes:

determining a 2D-3D correspondence between the first pixel position and the third position information, where the 2D-3D correspondence indicates a correspondence between two-dimensional coordinates of the target parking space line in the target image and three-dimensional coordinates of the target parking space line in actual space; and determining the pose information based on the 2D-3D correspondence.

According to a third aspect, this disclosure provides a pose determining method. The method includes:

obtaining a target image, where the target image includes a target parking space mark; and determining pose information based on the target parking space mark and a first pixel position that is of a circumscribed pattern of the target parking space mark and that is in the target image, where the pose information indicates a corresponding pose of a terminal during photographing of the target image.

Optionally, in a design of the third aspect, the determining pose information based on the target parking space mark and a first pixel position that is of a circumscribed rectangular frame of the target parking space mark and that is in the target image includes:

obtaining the first pixel position that is of the circumscribed pattern of the target parking space mark and that is in the target image;

obtaining third position information of the circumscribed pattern in a digital map, where the third position information indicates a coordinate position of the circumscribed pattern in the digital map; and determining the pose information based on the first pixel position and the third position information.

Optionally, in a design of the third aspect, the determining pose information based on the target parking space mark and a first pixel position that is of a circumscribed pattern of the target parking space mark and that is in the target image includes:

sending the target image to a server; and receiving the pose information sent by the server, where the pose information is determined by the server based on the first pixel position that is of the circumscribed pattern of the target parking space mark and that is in the target image, and third position information corresponding to the target circumscribed pattern in a digital map; and the third position information indicates position information that is of the circumscribed pattern of the target parking space mark and that is in the digital map.

Optionally, in a design of the third aspect, the determining pose information based on the target parking space mark and a first pixel position that is of a circumscribed pattern of the target parking space mark and that is in the target image includes:

obtaining the first pixel position that is of the circumscribed pattern of the target parking space mark and that is in the target image;

sending the target parking space mark and the first pixel position to a server; and receiving the pose information sent by the server, where the pose information is determined by the server based on the first pixel position and third position information corresponding to the circumscribed pattern in a digital map, and the third position information indicates position information that is of the circumscribed pattern of the target parking space mark and that is in the digital map.

Optionally, in a design of the third aspect, the determining pose information based on the target parking space mark and a first pixel position that is of a circumscribed pattern of the target parking space mark and that is in the target image includes:

obtaining third position information corresponding to the circumscribed pattern in a digital map, where the third position information indicates position information that is of the circumscribed pattern of the target parking space mark and that is in the digital map;

sending the target image and the third position information to a server; and receiving the pose information sent by the server, where the pose information is determined by the server based on the third position information and the first pixel position that is of the circumscribed pattern of the target parking space mark and that is in the target image.

Optionally, in a design of the third aspect, the method further includes:

displaying a parking space mark input indication box; and obtaining the target parking space mark input in the parking space mark input indication box.

Optionally, in a design of the third aspect, the pose information includes a coordinate position of the terminal device during photographing of the target image.

The method further includes:

performing route planning based on the coordinate position to obtain a planned route, where a start point or an end point of the planned route is the coordinate position; and displaying a two-dimensional navigation interface, where the two-dimensional navigation interface includes the planned route.

Optionally, in a design of the third aspect, the pose information includes a coordinate position, a yaw angle, a pitch angle, and a roll angle of the terminal device during photographing of the target image; and the method further includes:

displaying an AR navigation interface, where the AR navigation interface includes a navigation guidance and an image of an environment including the current terminal device, and the navigation guidance is determined based on the coordinate position, the yaw angle, the pitch angle, and the roll angle of the terminal device.

Optionally, in a design of the third aspect, the method further includes:

obtaining positioning information of the terminal device during photographing of the target image; and the obtaining third position information corresponding to the circumscribed pattern in a digital map includes: obtaining, from the digital map, the third position information that corresponds to the circumscribed pattern matching the positioning information.

Optionally, in a design of the third aspect, the circumscribed pattern includes a first edge line, a second edge line, and a third edge line. At least two of the first edge line, the second edge line, and the third edge line are not parallel in the digital map, and a second corner point is an intersection point of the first edge line and the second edge line. The first pixel position includes direction information of the first edge line, the second edge line, and the third edge line in the target image, and the third position information includes preset directions corresponding to the first edge line, the second edge line, and the third edge line in the digital map; or the first pixel position includes direction information of the first edge line and the second edge line in the target image, and a pixel position of the second corner point in the target image; and the third position information includes preset directions corresponding to the first edge line and the second edge line in the digital map, and a preset position corresponding to the second corner point in the digital map.

Optionally, in a design of the third aspect, the determining pose information based on the first pixel position and the third position information includes:

determining a 2D-3D correspondence between the first pixel position and the third position information, where the 2D-3D correspondence indicates a correspondence between two-dimensional coordinates of the target parking space line in the target image and three-dimensional coordinates of the target parking space line in actual space; and determining the pose information based on the 2D-3D correspondence.

Optionally, in a design of the third aspect, the circumscribed pattern includes a circumscribed rectangular frame.

According to a fourth aspect, this disclosure provides a pose determining method. The method includes:

obtaining a first pixel position that is of a circumscribed pattern of a target parking space mark and that is in a target image, where the target image includes the target parking space mark;

obtaining third position information corresponding to the circumscribed pattern in a digital map, where the third position information indicates a coordinate position of the circumscribed pattern in the digital map; and determining pose information based on the first pixel position and the third position information, where the pose information indicates a corresponding pose of a terminal during photographing of the target image.

Optionally, in a design of the fourth aspect, the obtaining a first pixel position that is of a circumscribed pattern of a target parking space mark and that is in a target image includes:

receiving the target image sent by the terminal device; and determining the first pixel position that is of the circumscribed pattern of the target parking space mark and that is in the target image.

Optionally, in a design of the fourth aspect, the obtaining a first pixel position that is of a circumscribed pattern of a target parking space mark and that is in a target image includes:

receiving the first pixel position that is of the circumscribed pattern of the target parking space mark, that is in the target image, and that is sent by the terminal device.

Optionally, in a design of the fourth aspect, the obtaining third position information corresponding to the circumscribed pattern in a digital map includes:

receiving the target image or the target parking space mark sent by the terminal device; and determining, from the digital map, third position information corresponding to the circumscribed pattern in the digital map.

Optionally, in a design of the fourth aspect, the obtaining third position information corresponding to the circumscribed pattern in a digital map includes:

receiving the third position information that corresponds to the circumscribed pattern in the digital map and that is sent by the terminal device.

Optionally, in a design of the fourth aspect, the circumscribed pattern includes a first edge line, a second edge line, and a third edge line. At least two of the first edge line, the second edge line, and the third edge line are not parallel in the digital map, and a second corner point is an intersection point of the first edge line and the second edge line. The first pixel position includes direction information of the first edge line, the second edge line, and the third edge line in the target image, and the third position information includes preset directions corresponding to the first edge line, the second edge line, and the third edge line in the digital map; or the first pixel position includes direction information of the first edge line and the second edge line in the target image, and a pixel position of the second corner point in the target image; and the third position information includes preset directions corresponding to the first edge line and the second edge line in the digital map, and a preset position corresponding to the second corner point in the digital map.

Optionally, in a design of the fourth aspect, the determining pose information based on the first pixel position and the third position information includes:

determining a 2D-3D correspondence between the first pixel position and the third position information, where the 2D-3D correspondence indicates a correspondence between two-dimensional coordinates of the target parking space line in the target image and three-dimensional coordinates of the target parking space line in actual space; and determining the pose information based on the 2D-3D correspondence.

Optionally, in a design of the fourth aspect, the circumscribed pattern includes a circumscribed rectangular frame.

According to a fifth aspect, this disclosure provides a pose determining apparatus. The apparatus includes:

an obtaining module, configured to obtain a target image, where the target image includes a target parking space mark and a target parking space line, and a target parking space corresponding to the target parking space mark includes the target parking space line; and a determining module, configured to determine pose information based on the target parking space mark and the target parking space line, where the pose information indicates a corresponding pose of a terminal during photographing of the target image.

Optionally, in a design of the fifth aspect, the determining module is specifically configured to:

obtain a first pixel position of the target parking space line in the target image;

obtain third position information corresponding to the target parking space line in a digital map, where the third position information indicates a position of the target parking space line in the digital map; and determine the pose information based on the first pixel position and the third position information.

Optionally, in a design of the fifth aspect, the determining module is specifically configured to:

send the target image to a server; and receive the pose information sent by the server, where the pose information is determined by the server based on a first pixel position of the target parking space line in the target image and third position information corresponding to the target parking space line in a digital map, and the third position information indicates a position of the target parking space line in the digital map.

Optionally, in a design of the fifth aspect, the determining module is specifically configured to:

obtain a first pixel position of the target parking space line in the target image;

send the target parking space mark and the first pixel position to a server; and receive the pose information sent by the server, where the pose information is determined by the server based on the first pixel position and third position information corresponding to the target parking space line in a digital map, and the third position information indicates a position of the target parking space line in the digital map.

Optionally, in a design of the fifth aspect, the determining module is specifically configured to:

obtain third position information corresponding to the target parking space line in a digital map, where the third position information indicates position information of the target parking space line in the digital map;

send the target image and the third position information to a server; and receive the pose information sent by the server, where the pose information is determined by the server based on the third position information and a first pixel position of the target parking space line in the target image.

Optionally, in a design of the fifth aspect, the obtaining module is specifically configured to:

display a target photographing interface, where the target photographing interface includes a photographing area, and the photographing area includes a preset guide contour; and obtain, through photographing, the target image if the target parking space in the photographing area is located within the preset guide contour or a position difference between a target parking space in the photographing area and the preset guide contour falls within a preset range.

Optionally, in a design of the fifth aspect, the apparatus further includes:

a display module, configured to display a parking space mark input indication box in the target image.

The obtaining module is further configured to obtain the target parking space mark input in the parking space mark input indication box.

Optionally, in a design of the fifth aspect, the pose information includes a coordinate position of the terminal device during photographing of the target image.

The apparatus further includes:

a route planning module, configured to perform route planning based on the coordinate position to obtain a planned route, where a start point or an end point of the planned route is the coordinate position.

The display module is further configured to display a two-dimensional navigation interface, where the two-dimensional navigation interface includes the planned route.

Optionally, in a design of the fifth aspect, the pose information includes a coordinate position, a yaw angle, a pitch angle, and a roll angle of the terminal device during photographing of the target image.

The display module is further configured to display an AR navigation interface, where the AR navigation interface includes a navigation guidance and an image of an environment including the current terminal device, and the navigation guidance is determined based on the coordinate position, the yaw angle, the pitch angle, and the roll angle of the terminal device.

Optionally, in a design of the fifth aspect, the determining module is specifically configured to:

obtain positioning information of the terminal device during photographing of the target image; and obtain, from the digital map, the third position information that matches the positioning information and that corresponds to the target parking space line in the digital map.

Optionally, in a design of the fifth aspect, the target parking space line includes a first parking space line, a second parking space line, and a third parking space line. At least two of the first parking space line, the second parking space line, and the third parking space line are not parallel in the digital map, and a first corner point is an intersection point of the first parking space line and the second parking space line. The first pixel position includes direction information of the first parking space line, the second parking space line, and the third parking space line in the target image, and the third position information includes preset directions corresponding to the first parking space line, the second parking space line, and the third parking space line in the digital map; or the first pixel position includes direction information of the first parking space line and the second parking space line in the target image, and a pixel position of the first corner point in the target image; and the third position information includes preset directions corresponding to the first parking space line and the second parking space line in the digital map, and a preset position corresponding to the first corner point in the digital map.

Optionally, in a design of the fifth aspect, the determining module is specifically configured to:

obtain a gravity direction of the terminal device during photographing of the target image; and determine the pose information based on the first pixel position, the third position information, and the gravity direction.

Optionally, in a design of the fifth aspect, the determining module is specifically configured to:

determine a 2D-3D correspondence between the first pixel position and the third position information, where the 2D-3D correspondence indicates a correspondence between two-dimensional coordinates of the target parking space line in the target image and three-dimensional coordinates of the target parking space line in actual space; and determine the pose information based on the 2D-3D correspondence.

According to a sixth aspect, this disclosure provides a pose determining apparatus. The apparatus includes:

an obtaining module, configured to: obtain a first pixel position of a target parking space line in a target image, where the target image includes a target parking space mark and a target parking space line, and a target parking space corresponding to the target parking space mark includes the target parking space line; and obtain third position information corresponding to the target parking space line in a digital map, where the third position information indicates a coordinate position of the target parking space line in the digital map; and a determining module, configured to determine pose information based on the first pixel position and the third position information, where the pose information indicates a corresponding pose of a terminal during photographing of the target image.

Optionally, in a design of the sixth aspect, the obtaining module is specifically configured to:

receive the target image sent by the terminal device; and determine the first pixel position of the target parking space line in the target image.

Optionally, in a design of the sixth aspect, the obtaining module is specifically configured to:

receive the first pixel position that is of the target parking space line in the target image and that is sent by the terminal device.

Optionally, in a design of the sixth aspect, the obtaining module is specifically configured to:

receive the target image or the target parking space mark sent by the terminal device; and determine, from the digital map, the third position information corresponding to the target parking space line.

Optionally, in a design of the sixth aspect, the obtaining module is specifically configured to:

receive the third position information that corresponds to the target parking space line in the digital map and that is sent by the terminal device.

Optionally, in a design of the sixth aspect, the target parking space line includes a first parking space line, a second parking space line, and a third parking space line. At least two of the first parking space line, the second parking space line, and the third parking space line are not parallel in the digital map, and a first corner point is an intersection point of the first parking space line and the second parking space line. The first pixel position includes direction information of the first parking space line, the second parking space line, and the third parking space line in the target image, and the third position information includes preset directions corresponding to the first parking space line, the second parking space line, and the third parking space line in the digital map; or the first pixel position includes direction information of the first parking space line and the second parking space line in the target image, and a pixel position of the first corner point in the target image; and the third position information includes preset directions corresponding to the first parking space line and the second parking space line in the digital map, and a preset position corresponding to the first corner point in the digital map.

Optionally, in a design of the sixth aspect, the determining module is specifically configured to:

receive a gravity direction that is of the terminal device during photographing of the target image and that is sent by the terminal device; and determine the pose information based on the first pixel position, the third position information, and the gravity direction.

Optionally, in a design of the sixth aspect, the determining module is specifically configured to:

determine a 2D-3D correspondence between the first pixel position and the third position information, where the 2D-3D correspondence indicates a correspondence between two-dimensional coordinates of the target parking space line in the target image and three-dimensional coordinates of the target parking space line in actual space; and determine the pose information based on the 2D-3D correspondence.

According to a seventh aspect, this disclosure provides a pose determining apparatus. The apparatus includes:

an obtaining module, configured to obtain a target image, where the target image includes a target parking space mark; and a determining module, configured to determine pose information based on the target parking space mark and a first pixel position that is of a circumscribed pattern of the target parking space mark and that is in the target image, where the pose information indicates a corresponding pose of a terminal during photographing of the target image.

Optionally, in a design of the seventh aspect, the determining module is specifically configured to:

obtain the first pixel position that is of the circumscribed pattern of the target parking space mark and that is in the target image;

obtain third position information corresponding to the circumscribed pattern in a digital map, where the third position information indicates a coordinate position of the circumscribed pattern in the digital map; and determine the pose information based on the first pixel position and the third position information.

Optionally, in a design of the seventh aspect, the determining module is specifically configured to:

obtain the first pixel position that is of the circumscribed pattern of the target parking space mark and that is in the target image;

obtain third position information corresponding to the circumscribed pattern in a digital map, where the third position information indicates a coordinate position of the circumscribed pattern in the digital map; and determine the pose information based on the first pixel position and the third position information.

Optionally, in a design of the seventh aspect, the circumscribed pattern includes a circumscribed rectangular frame.

According to an eighth aspect, this disclosure provides a pose determining apparatus. The apparatus includes:

an obtaining module, configured to: obtain a first pixel position that is of a circumscribed pattern of a target parking space mark and that is in a target image, where the target image includes the target parking space mark; and obtain third position information corresponding to the circumscribed pattern in a digital map, where the third position information indicates a coordinate position of the circumscribed pattern in the digital map; and a determining module, configured to determine pose information based on the first pixel position and the third position information, where the pose information indicates a corresponding pose of a terminal during photographing of the target image.

Optionally, in a design of the eighth aspect, the circumscribed pattern includes a first edge line, a second edge line, and a third edge line. At least two of the first edge line, the second edge line, and the third edge line are not parallel in the digital map, and a second corner point is an intersection point of the first edge line and the second edge line. The first pixel position includes direction information of the first edge line, the second edge line, and the third edge line in the target image, and the third position information includes preset directions corresponding to the first edge line, the second edge line, and the third edge line in the digital map; or the first pixel position includes direction information of the first edge line and the second edge line in the target image, and a pixel position of the second corner point in the target image; and the third position information includes preset directions corresponding to the first edge line and the second edge line in the digital map, and a preset position corresponding to the second corner point in the digital map.

Optionally, in a design of the eighth aspect, the determining module is specifically configured to:

determine a 2D-3D correspondence between the first pixel position and the third position information, where the 2D-3D correspondence indicates a correspondence between two-dimensional coordinates of the target parking space line in the target image and three-dimensional coordinates of the target parking space line in actual space; and determine the pose information based on the 2D-3D correspondence.

Optionally, in a design of the eighth aspect, the circumscribed pattern includes a circumscribed rectangular frame.

According to a ninth aspect, this disclosure provides a pose determining apparatus, including a display, a camera, one or more processors, a memory, a plurality of applications, and one or more computer programs. The one or more computer programs are stored in the memory. The one or more computer programs include instructions. When the instructions are executed by the pose determining apparatus, the pose determining apparatus is enabled to perform the steps according to the first aspect and any one of the possible implementations of the first aspect, or the third aspect and any one of the possible implementations of the third aspect.

According to a tenth aspect, this disclosure provides a server, including one or more processors, a memory, a plurality of applications, and one or more computer programs. The one or more computer programs are stored in the memory. The one or more computer programs include instructions. When the instructions are executed by an electronic device, the electronic device is enabled to perform the steps according to the second aspect and any one of the possible implementations of the second aspect, or the fourth aspect and any one of the possible implementations of the fourth aspect.

According to an eleventh aspect, this disclosure provides a computer storage medium, including computer instructions. When the computer instructions are run on an electronic device or a server, the electronic device is enabled to perform the steps according to the first aspect and any one of the possible implementations of the first aspect, or the third aspect and any one of the possible implementations of the third aspect.

According to a twelfth aspect, this disclosure provides a computer storage medium, including computer instructions. When the computer instructions are run on an electronic device or a server, the electronic device is enabled to perform the steps according to the second aspect and any one of the possible implementations of the second aspect, or the fourth aspect and any one of the possible implementations of the fourth aspect.

According to a thirteenth aspect, this disclosure provides a computer program product. When the computer program product is run on an electronic device or a server, the electronic device is enabled to perform the steps according to the first aspect and any one of the possible implementations of the first aspect, or the third aspect and any one of the possible implementations of the third aspect.

According to a fourteenth aspect, this disclosure provides a computer program product. When the computer program product is run on an electronic device or a server, the electronic device is enabled to perform the steps according to the second aspect and any one of the possible implementations of the second aspect, or the fourth aspect and any one of the possible implementations of the fourth aspect.

Embodiments of this disclosure provide the pose determining method, including: obtaining the target image, where the target image includes the target parking space mark and the target parking space line, and the target parking space corresponding to the target parking space mark includes the target parking space line; and determining the pose information based on the target parking space mark and the target parking space line, where the pose information indicates the corresponding pose of the terminal during photographing of the target image. In the foregoing manner, when positioning precision of a GPS signal is poor, the pose information may be determined based on the target parking space mark and the target parking space line, to implement positioning. In addition, compared with a manner in which positioning is performed based on a 3D point cloud, in embodiments, the digital map includes less data.

BRIEF DESCRIPTION OF DRAWINGS

FIG. 2b is a block diagram of a structure of a server according to an embodiment of this disclosure;

FIG. 2c is a block diagram of a structure of a pose determining system according to an embodiment of this disclosure;

FIG. 3 is a schematic diagram of a pose determining method according to an embodiment of this disclosure;

FIG. 6b is a schematic flowchart of a pose determining method according to an embodiment of this disclosure;

FIG. 7a is a schematic flowchart of a pose determining method according to an embodiment of this disclosure;

FIG. 7*b* is a schematic flowchart of a pose determining method according to an embodiment of this disclosure;

FIG. 8*e* is a schematic flowchart of a pose determining method according to an embodiment of this disclosure;

DESCRIPTION OF EMBODIMENTS

The following describes embodiments of the present invention with reference to the accompanying drawings in embodiments of the present invention. Terms used in an implementation part of the present invention are intended only to explain specific embodiments of the present invention, and not intended to limit the present invention.

The following describes embodiments of this disclosure with reference to the accompanying drawings. A person of ordinary skill in the art may learn that the technical solutions provided in embodiments of this disclosure are also applicable to a similar technical problem as a technology develops and a new scenario emerges.

In the specification, claims, and accompanying drawings of this disclosure, terms "first", "second", and the like are intended to distinguish between similar objects, but do not necessarily indicate a specific order or sequence. It should be understood that the terms used in such a way are interchangeable in appropriate circumstances, which is merely a distinguishing manner that is used when objects having a same attribute are described in embodiments of this disclosure. In addition, terms "include", "comprise" and any other variants thereof mean to cover the non-exclusive inclusion, so that a process, method, system, product, or device that includes a series of units is not necessarily limited to those units, but may include other units not expressly listed or inherent to such a process, method, product, or device.

Figure 1:
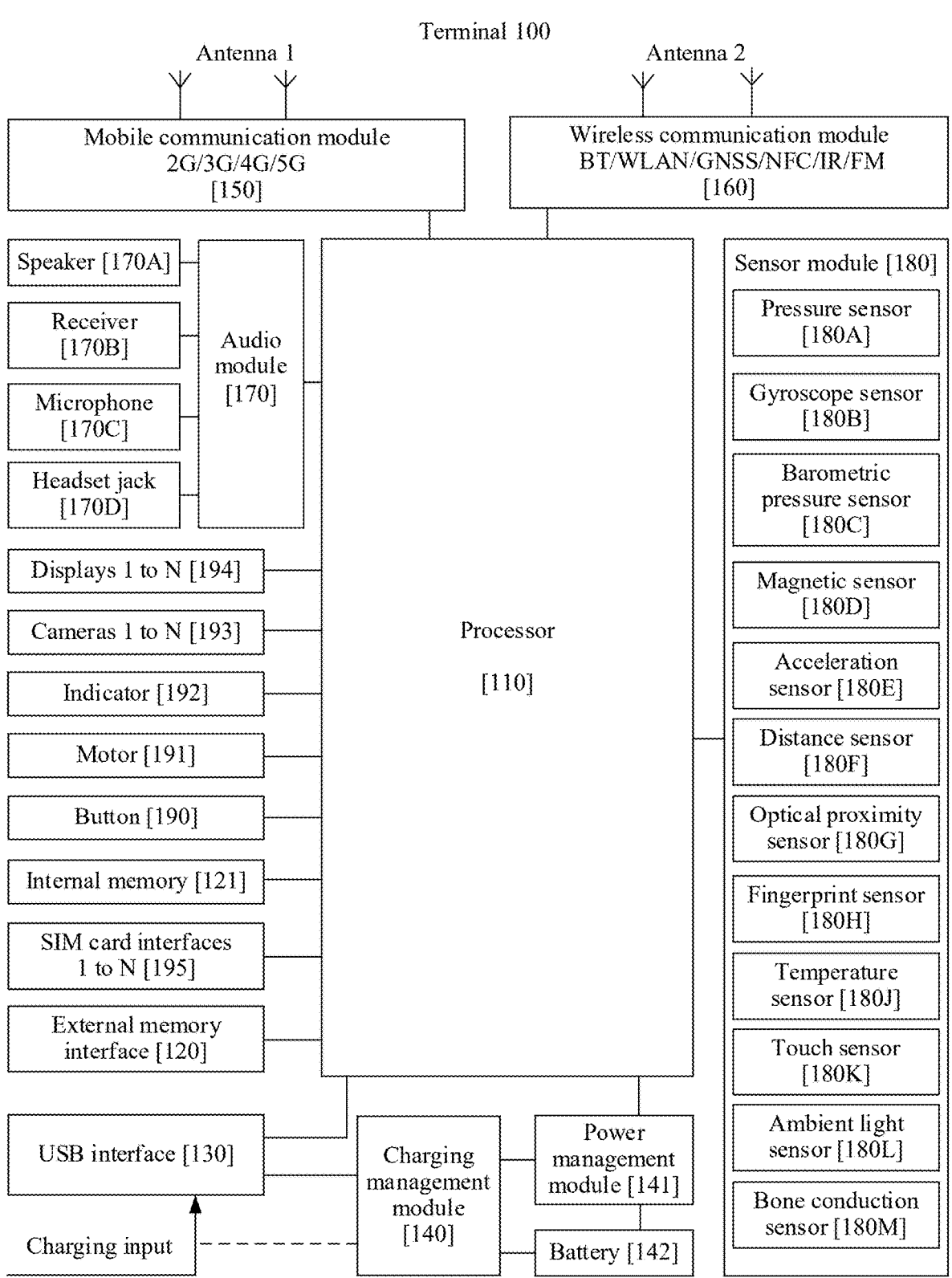
FIG. 1 is a schematic diagram of a structure of a terminal device according to an embodiment of this disclosure.

For ease of understanding, the following describes, by using an example, a structure of a terminal device 100 provided in an embodiment of this disclosure. Refer to FIG. 1. FIG. 1 is a schematic diagram of a structure of a terminal device according to an embodiment of this disclosure.

As shown in the FIG. 1, the terminal 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the example structure in this embodiment of the present invention does not constitute a specific limitation on the terminal 100. In some other embodiments of this disclosure, the terminal 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural network processing unit (NPU), and/or the like. Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be configured to perform the audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through the Bluetooth headset.

The MIPI interface may be used to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that complies with a USB standard specification, and may be specifically a mini USB interface, a micro USB interface, a USB Type-C interface, or the like. The USB interface 130 may be configured to connect to a charger to charge the terminal 100, and may also be configured to transmit data between the terminal 100 and a peripheral device, or may be configured to connect to a headset, to play audio by using the headset. The interface may be further configured to connect to another electronic device such as an AR device.

It may be understood that an interface connection relationship between the modules that is shown in this embodiment of the present invention is merely an example for description, and does not constitute a limitation on the structure of the terminal 100. In some other embodiments of this disclosure, the terminal 100 may alternatively use an interface connection mode different from that in the foregoing embodiment, or a combination of a plurality of interface connection modes.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the terminal 100. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be configured to monitor parameters such as a battery capacity, a battery cycle count, and a battery status of health (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal 100 may be configured to cover one or more communication frequency bands. Different antennas may be further reused, to improve antenna utilization. For example, the antenna 1 may be reused as a diversity antenna of a wireless local area network. In some other embodiments, an antenna may be used in combination with a tuning switch.

The mobile communication module 150 can provide a solution, applied to the terminal 100, to wireless communication including 2G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least a part of functional modules in the mobile communication module 150 may be disposed in the processor 110. In some embodiments, at least a part of functional modules of the mobile communication module 150 and at least a part of modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a solution, applied to the terminal 100, to wireless communication including a wireless local area network (WLAN) (for example, a wireless fidelity (Wi-Fi) network), Bluetooth (, BT), a global navigation satellite system (GNSS), frequency modulation (FM), near field communication (NFC), an infrared (IR) technology, or the like. The wireless communication module 160 may be one or more components integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the terminal 100, the antenna 1 is coupled to the mobile communication module 150, and the antenna 2 is coupled to the wireless communication module 160, so that the terminal 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal 100 implements the display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the terminal 100 may include one or N displays 194, where N is a positive integer greater than 1.

The terminal 100 can implement a photographing function by using the ISP, the camera 193, the video codec, the GPU, the display 194, the application processor, and the like.

The ISP may be configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, to convert a processed signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated by using the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP for conversion into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may process another digital signal in addition to the digital image signal. For example, when the terminal 100 selects a frequency bin, the digital signal processor is configured to perform Fourier transform and the like on frequency-bin energy.

The video codec is configured to compress or decompress a digital video. The terminal 100 may support one or more video codecs. In this way, the terminal 100 can play or record videos in a plurality of coding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the terminal 100 may be implemented by using the NPU, for example, image recognition, facial recognition, speech recognition, and text understanding.

The external memory interface 120 may be configured to connect to an external memory card such as a micro SD card, to extend a storage capability of the terminal 100. The external memory card communicates with the processor 110 through the external memory interface 120, to implement a data storage function. For example, data such as music and a video is stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data and an address book) created during use of the terminal 100, and the like. In addition, the internal memory 121 may include a high-speed random access memory, and may further include a nonvolatile memory, for example, at least one magnetic disk storage device, a flash memory device, or a universal flash storage (UFS). The processor 110 runs the instructions stored in the internal memory 121 and/or the instructions stored in the memory disposed in the processor, to execute various function applications of the terminal 100 and process data.

The terminal 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode the audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The terminal 100 may listen to music or answer a hands-free call by using the speaker 170A.

The receiver 170B, also referred to as an "earpiece", is configured to convert an audio electrical signal into a sound signal. When the terminal 100 is used to answer a call or receive a voice message, the receiver 170B may be put close to a human ear to listen to a voice.

The microphone 170C, also referred to as "mike" or "mic", is configured to convert a sound signal into an electrical signal. When making a call or sending a voice message, a user may make a sound near the microphone 170C through the mouth, to input a sound signal to the microphone 170C. At least one microphone 170C may be disposed in the terminal 100. In some other embodiments, two microphones 170C may be disposed in the terminal 100, to collect a sound signal and further implement a noise reduction function. In some other embodiments, three, four, or more microphones 170C may alternatively be disposed in the terminal 100, to collect a sound signal, reduce noise, recognize a sound source, implement a directional recording function, and the like.

The headset jack 170D is configured to connect to a wired headset. The headset jack 170D may be the USB interface 130, a 3.5 mm open mobile terminal platform (OMTP) standard interface, or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates using a conductive material. When a force is applied to the pressure sensor 180A, capacitance between electrodes changes. The terminal 100 determines pressure strength based on a capacitance change. When a touch operation is performed on the display 194, the terminal 100 detects intensity of the touch operation by using the pressure sensor 180A. The terminal 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to a first pressure threshold is performed on an SMS message application icon, an instruction for creating a new SMS message is executed.

The gyroscope sensor 180B may be configured to determine a moving posture of the terminal 100. In some embodiments, angular velocities of the terminal 100 around three axes (namely, x, y, and z axes) may be determined by using the gyroscope sensor 180B. The gyroscope sensor 180B may be configured to implement image stabilization during photographing. For example, when the shutter is opened, the gyroscope sensor 180B detects an angle at which the terminal 100 jitters, calculates, based on the angle, a distance for which a lens module needs to compensate, and allows the lens to cancel out the jitter of the terminal 100 through reverse motion, to implement image stabilization. The gyroscope sensor 180B may also be used in a navigation scenario and a somatic game scenario.

The barometric pressure sensor 180C is configured to measure barometric pressure. In some embodiments, the terminal 100 calculates an altitude based on a barometric pressure value measured by the barometric pressure sensor 180C, to assist in positioning and navigation.

The magnetic sensor 180D includes a Hall sensor. The terminal 100 may detect opening and closing of a flip leather case by using the magnetic sensor 180D. In some embodiments, when the terminal 100 is a clamshell phone, the terminal 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect values of accelerations of the terminal 100 in various directions (usually on three axes). When the terminal 100 is still, a value and a direction of gravity may be detected. The acceleration sensor 180E may be further configured to recognize a posture of the electronic device, and is used in application such as switching between a landscape mode and a portrait mode or a pedometer.

The distance sensor 180F is configured to measure a distance. The terminal 100 may measure a distance through infrared light or a laser. In some embodiments, the terminal 100 may use the distance sensor 180F to measure a distance, to implement fast focusing in a photographing scenario.

The optical proximity sensor 180G may include, for example, a light-emitting diode (LED) and an optical detector such as a photodiode. The light-emitting diode may be an infrared light-emitting diode. The terminal 100 emits infrared light by using the light-emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen to save power. The optical proximity sensor 180G may also be used in a smart cover mode or a pocket mode to automatically perform screen unlocking or locking.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the terminal 100 is in a pocket to prevent a false touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using the temperature detected by the temperature sensor 180J. For example, when the temperature reported by the temperature sensor 180J exceeds a threshold, the terminal 100 lowers performance of a processor located near the temperature sensor 180J, to reduce power consumption to implement thermal protection. In some other embodiments, when the temperature is lower than another threshold, the terminal 100 heats the battery 142 to prevent the terminal 100 from being shut down abnormally because of a low temperature. In some other embodiments, when the temperature is lower than still another threshold, the terminal 100 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a touch event type. A visual output related to the touch operation may be provided through the display 194. In some other embodiments, the touch sensor 180K may also be disposed on a surface of the terminal 100 in a position different from a position of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may also be compatible with the external storage card. The terminal 100 interacts with a network through a SIM card, to implement functions such as calling and data communication. In some embodiments, the terminal 100 uses an eSIM, namely, an embedded SIM card. The eSIM card may be embedded into the terminal 100, and cannot be separated from the terminal 100.

A software system of the terminal 100 may use a layered architecture, an event-driven architecture, a microkernel architecture, a microservice architecture, or a cloud architecture. In this embodiment of the present invention, an Android system with the layered architecture is used as an example to illustrate a software structure of the terminal 100.

Figure 2A:
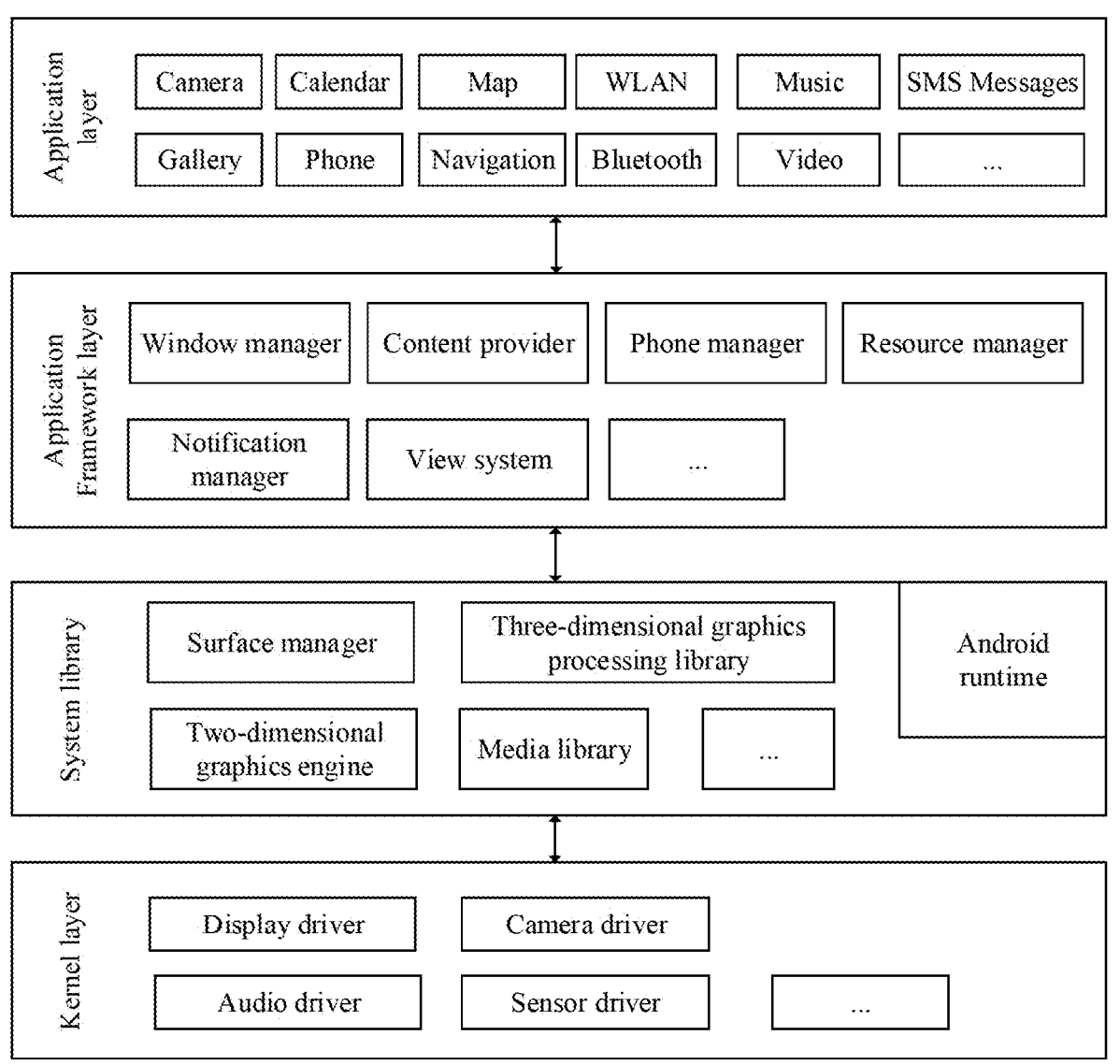
FIG. 2a is a block diagram of a software structure of a terminal device according to an embodiment of this disclosure.

FIG. 2*a* is a block diagram of the software structure of the terminal 100 according to this embodiment of the present invention.

In the layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 2*a*, the application packages may include applications such as Camera, Gallery, Calendar, Phone, Map, Navigation, WLAN, Bluetooth, Music, Videos, and SMS Messages.

The application framework layer provides an application programming interface (API) and a programming framework for an application at the application layer. The application framework layer includes some predefined functions.

As shown in FIG. 2*a*, the application framework layer may include a window manager, a content provider, a view system, a phone manager, a resource manager, a notification manager, and the like.

The window manager is configured to manage a window program. The window manager may obtain a size of the display, determine whether there is a status bar, lock a screen, take a screenshot, and the like.

The content provider is configured to store and obtain data, and enable the data to be accessed by an application. The data may include a video, an image, an audio, calls that are made and answered, a browsing history and bookmarks, an address book, and the like.

The view system includes visual controls such as a control for displaying text and a control for displaying a picture. The view system may be configured to construct an application. A display interface may include one or more views. For example, a display interface including a notification icon of SMS Messages may include a text display view and a picture display view.

The phone manager is configured to provide a communication function of the terminal 100, for example, management of call statuses (including answering, declining, and the like).

The resource manager provides various resources such as a localized character string, an icon, an image, a layout file, and a video file for an application.

The notification manager enables an application to display notification information in a status bar, and may be configured to convey a notification type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application that is run on a background, or may be a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes a working process of software and hardware of the terminal 100 by using an example with reference to a photographing capture scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. In an example in which the touch operation is a touch tap operation, and a control corresponding to the tap operation is a control of a camera application icon, the camera application invokes an interface of the application framework layer to start the camera application, then starts the camera driver by invoking the kernel layer, and captures a static image or a video through the camera 193.

The pose determining method provided in embodiments of this disclosure may be implemented with reference to the components disposed in the terminal 100. For example, communication with the server may be implemented by using the components such as the antenna 1, the antenna 2, the mobile communication module 150, and the wireless communication module 160, for example, transmitting a to-be-queried image and N text fields, and receiving an initial pose returned by the server. The audio module 170, the loudspeaker 170A, and the headset jack 170D may be used to broadcast some prompt information to the user through voice. Some prompt information for the user may be displayed by using the display 194. A to-be-queried image, an environmental image, an initial image, and the like may be photographed by using the camera 193. The gyroscope sensor 180B may be used to assist in determining of the motion posture and the like of the terminal. A function of determining the initial pose by the terminal 100 may be implemented by using the components disposed in the terminal 100 and the method provided in embodiments of this disclosure. The foregoing is merely an example, and does not constitute a limitation.

Another example embodiment of this disclosure provides a server 1300.

The server 1300 may include a processor 1310 and a transceiver 1320. The transceiver 1320 may be connected to the processor 1310, as shown in FIG. 2b. The transceiver 1320 may include a receiver and a transmitter, and may be configured to receive or send a message or data. The transceiver 1320 may be a network interface card. The server 1300 may further include an acceleration component (which may be referred to as an accelerator). When the acceleration component is a network acceleration component, the acceleration component may be a network interface card. The processor 1310 may be a control center of the server 1300, and is connected to all parts of the entire server 1300, such as the transceiver 1320, through various interfaces and lines. In the present invention, the processor 1310 may be a central processing unit (CPU). Optionally, the processor 1310 may include one or more processing units. The processor 1310 may alternatively be a digital signal processor, an application-specific integrated circuit, a field programmable gate array, a GPU, another programmable logic device, or the like. The server 1300 may further include a memory 1330. The memory 1330 may be configured to store a software program and a module. The processor 1310 reads software code and the module that are stored in the memory 1330, to perform various function applications of the server 1300 and process data.

An example embodiment of this disclosure provides a pose determining system. As shown in FIG. 2c, the system may include a terminal device and a server. The terminal device may be a mobile terminal, a human-computer interaction device, or an in-vehicle visual perception device, for example, a mobile phone, a floor scanner, an intelligent robot, an unmanned vehicle, an intelligent monitor, or an augmented reality (AR) wearing device. Correspondingly, the method provided in embodiments of this disclosure may be applied to an application field such as human-computer interaction, in-vehicle visual perception, augmented reality, intelligent monitoring, unmanned driving, garage car seeking, or exit seeking.

For ease of understanding, a pose determining method provided in embodiments of this disclosure is specifically described with reference to the accompanying drawings and an application scenario.

Refer to FIG. 3. FIG. 3 is a schematic diagram of a pose determining method according to an embodiment of this disclosure. As shown in FIG. 3, the pose determining method provided in this disclosure includes the following steps.

301: Obtain a target image, where the target image includes a target parking space mark and a target parking space line, and a target parking space corresponding to the target parking space mark includes the target parking space line.

In this embodiment of this disclosure, a terminal device may obtain the target image. The target image may include the target parking space in which a currently parked vehicle of a user is located.

In a scenario, after completing parking, the user needs to search for an exit of a garage, an elevator entrance or a staircase entrance for entering a ground floor, or the like. Generally, the user may look at an exit sign indication in the garage. However, no obvious exit sign indication may be found near the parked vehicle. In this embodiment of this disclosure, the terminal device may guide the user to photograph the target image including the target parking space in which the currently parked vehicle is located, or guide the user to select, from an album, the target image including the target parking space in which the currently parked vehicle is located. Accordingly, the terminal device may obtain the target image.

In a scenario, after entering a garage again, the user needs to search for the previously parked vehicle of the user. In this embodiment of this disclosure, the terminal device may guide the user to photograph a target image including any target parking space nearby, or guide the user to select, from an album, the target image including the target parking space in which the currently parked vehicle is located. Accordingly, the terminal device may obtain the target image.

In an embodiment, the terminal device may display a target photographing interface, where the target photographing interface includes a photographing area, and the photographing area includes a preset guide contour. If a target parking space in the photographing area is located within the preset guide contour or a position difference between a target parking space in the photographing area and the preset guide contour falls within a preset range, the target image is obtained through photographing.

The target photographing interface further comprises a guide prompt. The guide prompt is used to indicate to move the target parking space in the photographing area to be within the preset guide contour or the position difference between the target parking space and the preset guide contour falls within the preset range.

The target photographing interface further comprises a second guide prompt. The second guide prompt is used to indicate that an image in the photographing area does not meet a image condition until the image in the photographing area meets the image condition.

The preferred image condition includes at least: A definition of the image in the photographing area is greater than or equal to a definition threshold.

It should be noted that step 301 may be performed by the terminal device.

302: Determine pose information based on the target parking space mark and the target parking space line, where the pose information indicates a corresponding pose of a terminal during photographing of the target image.

In this embodiment of this disclosure, the terminal device may obtain a first pixel position of the target parking space line in the target image; obtain third position information corresponding to the target parking space line in a digital map, where the third position information indicates a position of the target parking space line in the digital map; and determine the pose information based on the first pixel position and the third position information.

In this embodiment of this disclosure, the first pixel position may be independently determined by the terminal device, or may be determined through interaction between the terminal device and a server, that is, the server determines the first pixel position, and sends the first pixel position to the terminal device. The following separately describes the processes.

1. The terminal device determines the first pixel position.

In this embodiment of this disclosure, the terminal device may determine the target parking space mark included in the target image and the first pixel position that is of the target parking space line corresponding to the target parking space mark and that is in the target image.

In this embodiment of this disclosure, after obtaining the target image, the terminal device may determine the target parking space mark included in the target image and the first pixel position that is of the target parking space line corresponding to the target parking space mark and that is in the target image.

Figure 4A:
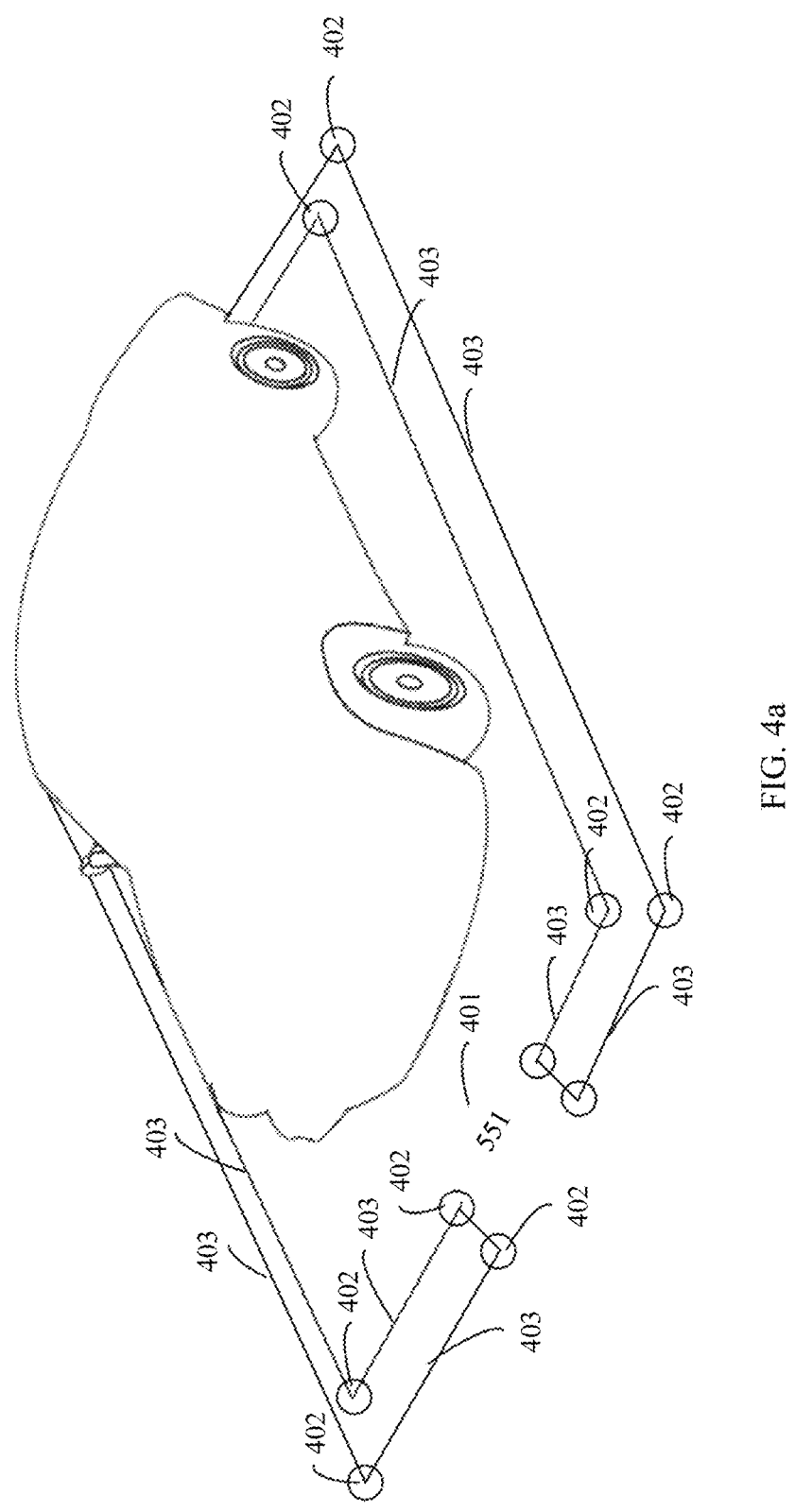
FIG. 4a is a schematic diagram of a target image according to an embodiment of this disclosure.

Optionally, the terminal device may recognize the target parking space mark included in the target image. For example, the terminal device may recognize the target parking space mark in the target image by using an optical character recognition (OCR) technology. In other words, the terminal device may determine, based on an image recognition algorithm, the target parking space mark included in the target image. Refer to FIG. 4a. FIG. 4a is a schematic diagram of a target image according to an embodiment of this disclosure. As shown in FIG. 4a, the target image includes a target parking space mark 401. The target parking space mark shown in FIG. 4a is specifically "551". A terminal device may learn, through recognition based on an image recognition algorithm, that the target parking space mark included in the current target image is "551".

It should be noted that the target parking space mark in this embodiment of this disclosure may be a string of digits that uniquely indicate a position of the target parking space, a character string including a text, or the like. This is not limited herein.

Optionally, the terminal device may display a parking space mark input indication box on a display interface, and the user may input a parking space mark in the parking space mark input indication box. Optionally, the terminal device may further display indication information on the display interface, to indicate the user to input, in the parking space mark input indication box, the target parking space mark corresponding to the target parking space in the target image. The target parking space mark may be a target parking space mark of the currently parked vehicle of the user, or a target parking space mark of any nearby vehicle. Accordingly, the terminal device may obtain the target parking space mark input in the parking space mark input indication box.

In this embodiment of this disclosure, the target parking space may include target parking space lines, a first corner point, and a target parking space mark. The first corner point is an intersection point between the target parking space lines of the target parking space. The terminal device may determine the first pixel position that is of the target parking space line corresponding to the target parking space mark and that is in the target image.

The first pixel position may include direction information of the target parking space line in the target image. Generally, a parking space line may be a boundary line of a printed line having a specific width on the ground. Parking space lines of a parking space are usually in two different directions. For details, refer to FIG. 4a. As shown in FIG. 4a, the target parking space usually includes a plurality of parking space lines, for example, a plurality of parking space lines 403 shown in FIG. 4a. Parking space lines 403 on left and right sides relative to a vehicle front direction are in a same direction in the target image, and parking space lines 403 on front and rear sides relative to the vehicle front direction are in a same direction in the target image. The target parking space line in this embodiment of this disclosure may be one or more of the plurality of parking space lines.

It should be noted that the target parking space line in this embodiment may be an edge line of a parking space printed line or a center line of a parking space printed line. This is not limited herein. The following uses an example in which the target parking space line includes a first parking space line.

In this embodiment of this disclosure, the terminal device may learn, through recognition, the first parking space line in the target image based on an image detection algorithm, and determine direction information of the first parking space line in the target image. The direction information may indicate a direction of the first parking space line in the target image. Optionally, the direction information of the first parking space line in the target image may be represented by using an included angle between the first parking space line and a direction of a lateral axis or a longitudinal axis in the target image, or the direction information of the first parking space line in the target image may be represented by using any two points on the first parking space line (the two points may determine a straight line). The any two points may be two points on the first parking space line, for example, endpoints or points in a line segment. It should be noted that because parking space lines of a parking space usually correspond to two directions in the target image, for details about determining direction information that includes one of the directions or determining direction information that includes the two directions, refer to description in the following embodiments. Details are not described herein.

It should be noted that the foregoing method for representing the direction information of the first parking space line in the target image is merely an example. In actual application, another manner of representing the direction information of the first parking space line in the target image may be selected. This is not limited herein.

It should be noted that the terminal device may determine direction information of at least one of the plurality of parking space lines in the target image. For specific description of the direction information of each of the at least one parking space line in the target image, refer to the description in the foregoing embodiment. Details are not described herein again.

In this embodiment of this disclosure, the first pixel position may include a pixel position of the first corner point in the target image. A parking space line may usually be a boundary line of a printed line having a specific width on the ground, and a first corner point may be one of a plurality of intersection points between parking space lines. For details, refer to FIG. 4a. As shown in FIG. 4a, the target parking space usually includes a plurality of corner points, for example, a plurality of corner points 402 shown in FIG. 4a. The first corner point may be one of the plurality of corner points 402.

Figure 4B:
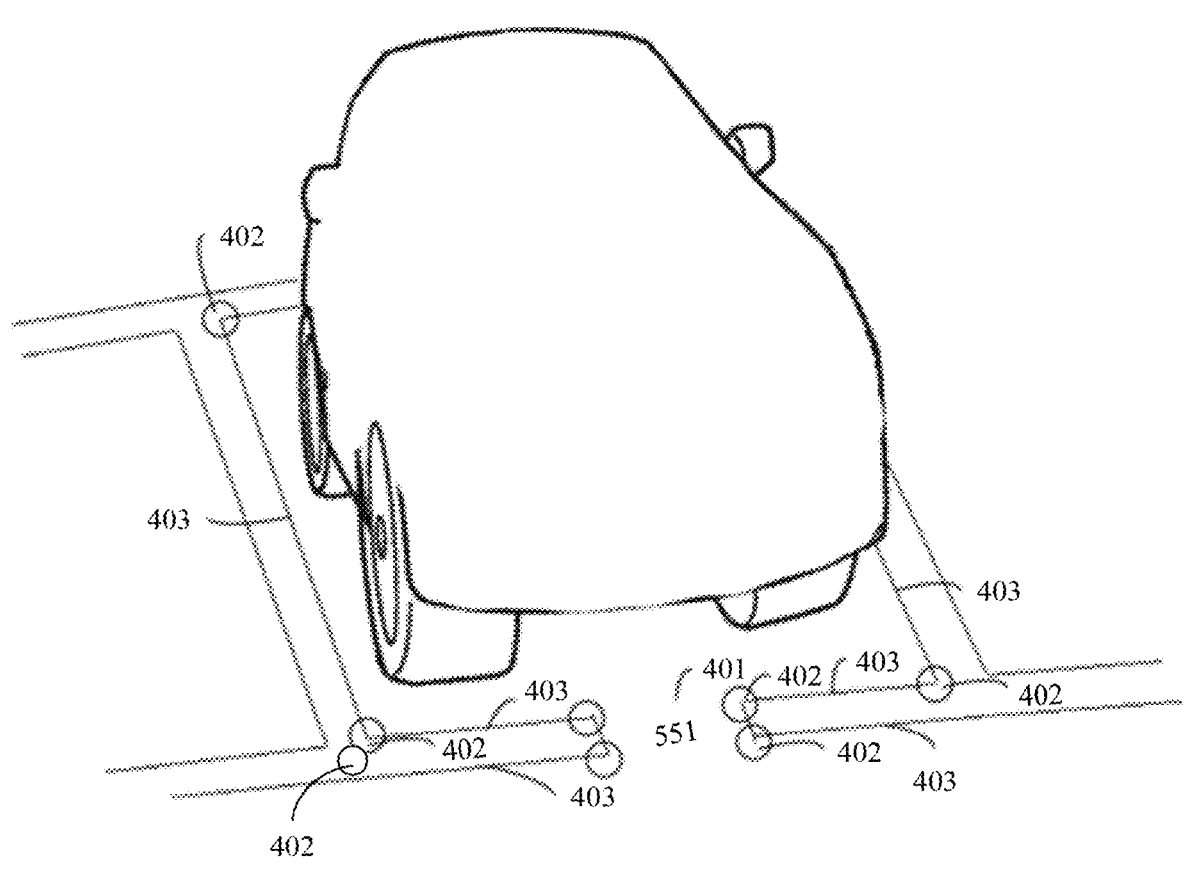
FIG. 4b is a schematic diagram of a target image according to an embodiment of this disclosure.

It should be noted that a corner point in this embodiment may be an intersection point of edge lines of a printed line of a parking space, or a center point of an intersection area of a printed line of a parking space (for example, a corner point 402 at the lower left corner in FIG. 4b). This is not limited herein.

In this embodiment of this disclosure, in a scenario, a parking space is independent, that is, no other parking space shares a parking space line with this parking space. In this case, corner points may include inner corner points and outer corner points. The inner corner point may be understood as a corner point that is located on an inner side of the printed line of the parking space and that is close to the vehicle. The outer corner point may be understood as a corner point that is located on an outer side of the printed line of the parking space and that is far away from the vehicle. In a scenario, a parking space is non-independent, that is, shares a part of parking space lines with another parking space. In this case, a quantity of outer corner points that may be included in corner points is less than a quantity of outer corner points included in an independent parking space. Refer to FIG. 4b. FIG. 4b is a schematic diagram of a target image according to an embodiment of this disclosure. As shown in FIG. 4b, the target image includes a plurality of corner points. Different from FIG. 4a, in FIG. 4b, a quantity of outer corner points is less than that in FIG. 4a because a part of outer corner points share a parking space printed line with another parking space.

In this embodiment of this disclosure, the terminal device may learn, through recognition, a first corner point in the target image based on an image detection algorithm, and determine a pixel position of the first corner point in the target image. Optionally, the pixel position of the first corner point in the target image may be represented by using pixel coordinates, or the pixel position of the first corner point in the target image may be represented by using direction information of two parking space lines corresponding to the first corner point (an intersection point of the two parking space lines corresponding to the first corner point is the first corner point).

It should be noted that the foregoing method for representing the pixel position of the first corner point in the target image is merely an example. In actual application, another manner of representing the pixel position of the first corner point in the target image may be selected. This is not limited herein.

It should be noted that the terminal device may determine a pixel position of at least one of the plurality of corner points in the target image. For specific description of a pixel position of each of the at least one corner point in the target image, refer to the description in the foregoing embodiment. Details are not described herein again.

Figure 4C:
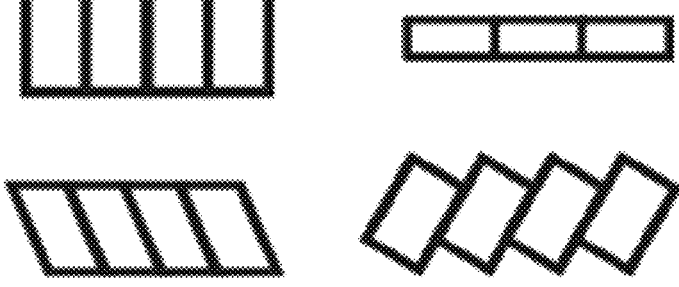
FIG. 4c is a schematic diagram of a target parking space according to an embodiment of this disclosure.

It should be noted that the target parking spaces shown in FIG. 4a and FIG. 4b are merely examples. In actual application, a shape of the target parking space may be, but not limited to, as shown in FIG. 4c. Refer to FIG. 4c. FIG. 4c is a schematic diagram of a target parking space according to an embodiment of this disclosure. FIG. 4c is a schematic diagram of shapes of four target parking spaces. The target parking space may be one of the plurality of parking spaces shown in FIG. 4c.

2. The server determines the target parking space mark included in the target image and the first pixel position that is of the target parking space line corresponding to the target parking space mark and that is in the target image.

In this embodiment of this disclosure, after obtaining the target image, the terminal may send the target image to the server. Accordingly, the server may determine the target parking space mark included in the target image and the first pixel position that is of the target parking space line corresponding to the target parking space mark and that is in the target image. For details about how the server determines the target parking space mark included in the target image and the first pixel position that is of the target parking space line corresponding to the target parking space mark and that is in the target image, refer to the description in the foregoing embodiment. Details are not described herein again.

In this embodiment of this disclosure, the third position information may be independently determined by the terminal device, or may be implemented through interaction between the terminal device and the server, that is, the server determines third position information, and sends the third position information to the terminal device. The following separately describes the processes.

1. The terminal device obtains the third position information corresponding to the target parking space line in a digital map.

In an embodiment, the terminal device may obtain the target image, determine the target parking space mark included in the target image and the first pixel position that is of the target parking space line corresponding to the target parking space mark and that is in the target image, and obtain the third position information corresponding to the target parking space line in the digital map. The third position information indicates a preset position of the target parking space line in the digital map.

The terminal device may obtain, from the digital map, second position information corresponding to the target parking space mark; and obtain, from the second position information, the third position information corresponding to the target parking space line.

In an embodiment, the terminal device may obtain the target image, and send the obtained target image to the server. The server may determine the target parking space mark included in the target image and a first pixel position that is of the target parking space line corresponding to the target parking space mark and that is in the target image; and send, to the terminal device, the target parking space mark included in the target image and the first pixel position that is of the target parking space line corresponding to the target parking space mark and that is in the target image. The terminal device may obtain the third position information corresponding to the target parking space line, where the third position information indicates preset position information of the target parking space in the digital map.

In this embodiment of this disclosure, the terminal device may store a preset map. The map includes each parking space mark and third position information corresponding to each parking space mark. The third position information may represent position information of a target parking space line in the digital map. Optionally, the third position information represents a three-dimensional coordinate position of the target parking space in the digital map.

The following describes how the terminal device obtains, based on the preset digital map, the third position information corresponding to the target parking space line.

In this embodiment of this disclosure, the map may include preset position information that represents a parking space and that corresponds to each parking space mark. Specifically, the map may include a position of at least one corner point of a parking space, a preset direction of at least one parking space line, or a preset position corresponding to a circumscribed rectangular frame of a target parking space mark. The preset position corresponding to the circumscribed rectangular frame of the target parking space mark may include a preset position of at least one corner point of the circumscribed rectangular frame, or a preset direction of at least one edge line. It should be noted that the preset position and the preset direction may be represented by using coordinates of the Universal Transverse Mercator (UTM). This is not limited in this disclosure.

In this embodiment of this disclosure, the map may include all position information corresponding to the target parking space mark (for example, including preset directions of a plurality of parking space lines and preset positions of a plurality of corner points). The first pixel position determined by the terminal device from the target image may include only direction information of a part of parking space lines of the target parking space, pixel positions of a part of corner points, and the like. Correspondingly, the third position information is position information that one-to-one correspond to parts of the first pixel position.

Figure 6A:
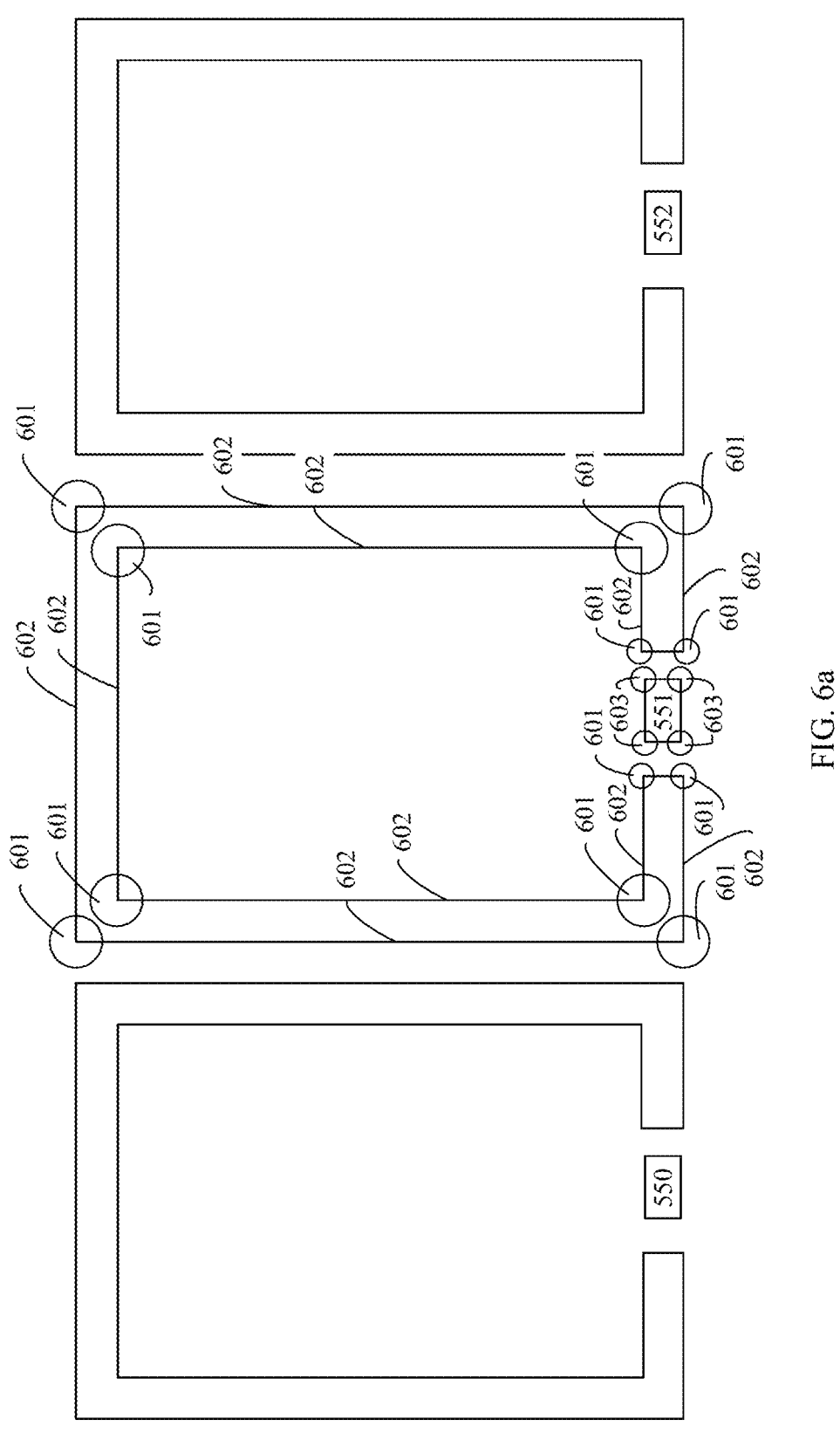
FIG. 6a is a schematic diagram of a map according to an embodiment of this disclosure.

In this embodiment of this disclosure, after determining the target parking space mark, the terminal device may determine the third position information based on the digital map. Specifically, when the first pixel position includes the direction information of the first parking space line in the target image, the third position information may include a preset direction corresponding to the first parking space line. Alternatively, when the first pixel position includes the pixel position of the first corner point in the target image, the third position information may include a preset position corresponding to the first corner point. Alternatively, when the first pixel position includes a pixel position of the circumscribed rectangular frame that is of the target parking space mark and that is in the target image, the third position information may include a preset position corresponding to the circumscribed rectangular frame of the target parking space mark. Refer to FIG. 6a. FIG. 6a is a schematic diagram of a map according to an embodiment of this disclosure. As shown in FIG. 6a, the map includes a plurality of corner points 601, parking space lines 602, corner points 603 of a circumscribed rectangular frame, and the like.

Optionally, in this embodiment of this disclosure, the first pixel position may include at least direction information of a feature line 1 in the target image, direction information of a feature line 2 in the target image, and direction information of a feature line 3 in the target image. The third position information may include a preset direction of the feature line 1, a preset direction of the feature line 2, and a preset direction of the feature line 3. The feature line 1, the feature line 2, or the feature line 3 may be a parking space line or an edge line of a circumscribed rectangular frame of the target parking space mark, and directions of at least two of the feature line 1, the feature line 2, or the feature line 3 in the target image are different.

Optionally, the terminal device may further obtain a gravity direction of the terminal device when the target image is photographed. In this embodiment of this disclosure, the first pixel position may include pixel coordinates of a corner point 1 in the target image, pixel coordinates of a corner point 2 in the target image, and the gravity direction. The third position information may include a preset position of the corner point 1 and a preset position of the corner point 2. The corner point 1 or the corner point 2 may be an intersection point of parking space lines or a corner point of a circumscribed rectangular frame of the target parking space mark.

Optionally, in this embodiment of this disclosure, the first pixel position may include pixel coordinates of a corner point 1 in the target image, pixel coordinates of a corner point 2 in the target image, pixel coordinates of a corner point 3 in the target image, and pixel coordinates of a corner point 4 in the target image. The third position information may include a preset position of the corner point 1, a preset position of the corner point 2, a preset position of the corner point 3, and a preset position of the corner point 4. The corner point 1, the corner point 2, the corner point 3, or the corner point 4 may be an intersection point of parking space lines or a corner point of a circumscribed rectangular frame of the target parking space mark.

The following describes a method for constructing the foregoing preset digital map. A map construction process may be performed in, but not limited to, one of the following three manners:

1. Manually measure position information of each parking space by using a distance and angle measurement instrument such as a total station.

2. Because a building is constructed according to a pre-designed CAD construction drawing of the building, if a parking space has been planned in the CAD drawing, a parking space drawing expected in the present invention is directly obtained from the CAD construction drawing.

3. A process of creating an image in a visual manner may be as follows: scanning a garage by using a camera (which may be used together with a laser lidar), to ensure that photos captured by the camera cover all parking spaces, and generating a 3D point cloud and poses of the photos in a point cloud coordinate system, where in this step, if there is a laser lidar, a result is directly generated; or if there is no laser lidar, a result is generated according to an SFM algorithm, and a depth map of each photo is generated according to an MVS (multiple-view stereo) algorithm; for each parking space, selecting an image that can clearly show the parking space, extracting a parking space mark of the parking space through OCR; manually marking, on the image, positions of inner corner points on left and right sides of parking space lines; and calculating coordinates, in the point cloud coordinate system, of inner focuses on the left and right sides of the parking space lines of the parking space based on the poses and the depth map of the images and the mark. A width of a parking space line is directly manually measured with a ruler. A length and a height of a parking space mark of this parking space are measured. Because the parking space mark is located in the middle of the parking space, coordinates of a parking space mark box can be calculated based on coordinates of the parking space line. In this way, a parking space mark of each parking space, coordinates of parking space lines, and coordinates of corner points of the parking space marks are obtained. After a parking space line map in the point cloud coordinate system is generated, the coordinate system is converted to a UTM coordinate system by using a differential GPS and marking control points.

2. The server determines the third position information corresponding to the target parking space line in the digital map.

In an embodiment, the terminal device may obtain the target image, determine the target parking space mark included in the target image and a first pixel position that is of the target parking space line corresponding to the target parking space mark and that is in the target image, and send, to the server, the target parking space mark included in the target image and the first pixel position that is of the target parking space line corresponding to the target parking space mark and that is in the target image. The server may obtain third position information corresponding to the target parking space line. The third position information indicates preset position information of the target parking space line in the digital map.

In an embodiment, the terminal device may obtain the target image, and send the obtained target image to the server. The server may determine the target parking space mark included in the target image and a first pixel position that is of the target parking space line corresponding to the target parking space mark and that is in the target image, and obtain the third position information corresponding to the target parking space line. The third position information indicates preset position information of the target parking space line in the digital map.

For details about how the server obtains the third position information corresponding to the target parking space line, where the third position information indicates the preset position information of the target parking space line in the digital map, refer to the description in the foregoing embodiment. Details are not described herein again.

In this embodiment of this disclosure, the step of determining the pose information based on the first pixel position and the third position information may be independently performed by the terminal device, or may be implemented through interaction between the terminal device and the server, that is, the server determines the pose information, and sends the pose information to the terminal device. The following separately describes the processes.

1. The terminal device determines the pose information based on the first pixel position and the third position information, where the target image is photographed by the terminal, and the pose information indicates a corresponding pose of the terminal during photographing of the target image.

In an embodiment, the terminal device obtains the target image; obtains the target parking space mark included in the target image and a first pixel position that is of the target parking space line corresponding to the target parking space mark and that is in the target image; obtains the third position information corresponding to the target parking space line; and determines the pose information based on the first pixel position and the third position information, where the target image is photographed by the terminal, and the pose information indicates a corresponding pose of the terminal during photographing of the target image.

In an embodiment, the terminal device obtains the target image, obtains the target parking space mark included in the target image and a first pixel position that is of the target parking space line corresponding to the target parking space mark and that is in the target image, and sends the target parking space mark included in the target image to the server. The server may obtain the third position information corresponding to the target parking space line, where the third position information indicates preset position information of the target parking space line in a digital map; and send the third position information corresponding to the target parking space line to the terminal device. The terminal device may determine the pose information based on the first pixel position and the third position information, where the target image is photographed by the terminal, and the pose information indicates a corresponding pose of the terminal during photographing of the target image.

In an embodiment, the terminal device obtains the target image, and sends the obtained target image to the server. The server may determine the target parking space mark included in the target image and a first pixel position that is of the target parking space line corresponding to the target parking space mark and that is in the target image; obtain the third position information corresponding to the target parking space line, where the third position information indicates preset position information of the target parking space line in a digital map; and send the first pixel position information and the third position information to the terminal device. The terminal device may determine the pose information based on the first pixel position and the third position information, where the target image is photographed by the terminal, and the pose information indicates a corresponding pose of the terminal during photographing of the target image.

In an embodiment, the terminal device obtains the target image, and sends the obtained target image to the server. The server may determine the target parking space mark included in the target image and a first pixel position that is of the target parking space line corresponding to the target parking space mark and that is in the target image; and send, to the terminal device, the first pixel position that is of the target parking space line corresponding to the target parking space mark and that is in the target image. The terminal device may obtain the third position information corresponding to the target parking space line, where the third position information indicates preset position information of the target parking space line in a digital map; and determine the pose information based on the first pixel position and the third position information, where the target image is photographed by the terminal, and the pose information indicates a corresponding pose of the terminal during photographing of the target image.

In this embodiment of this disclosure, after obtaining the first pixel position and the third position information, the terminal device may determine the pose information based on the first pixel position and the third position information. The target image is photographed by the terminal, and the pose information indicates the corresponding pose of the terminal during photographing of the target image.

In an embodiment, the terminal device may determine a pose based on the first pixel position and the third position information according to a 2D-3D coordinate matching algorithm.

In this embodiment of this disclosure, the target parking space line includes a first parking space line, a second parking space line, and a third parking space line. At least two of the first parking space line, the second parking space line, and the third parking space line are not parallel in the digital map, and a first corner point is an intersection point of the first parking space line and the second parking space line. The first pixel position includes direction information of the first parking space line, the second parking space line, and the third parking space line in the target image, and the third position information includes preset directions corresponding to the first parking space line, the second parking space line, and the third parking space line in the digital map. Alternatively, the first pixel position includes direction information of the first parking space line and the second parking space line in the target image, and a pixel position of the first corner point in the target image; and the third position information includes preset directions corresponding to the first parking space line and the second parking space line in the digital map, and a preset position corresponding to the first corner point in the digital map.

Specifically, the first pixel position may include at least direction information of a feature line 1 in the target image, direction information of a feature line 2 in the target image, and direction information of a feature line 3 in the target image. The third position information may include a preset direction of the feature line 1, a preset direction of the feature line 2, and a preset direction of the feature line 3. The terminal device may calculate the pose through 2D-3D matching of at least three detected lines (including both a horizontal line and a vertical line) according to a perspective-n-line pose calculation algorithm (PnL).

Specifically, the first pixel position may include pixel coordinates of a corner point 1 in the target image, pixel coordinates of a corner point 2 in the target image, and a gravity direction. The third position information may include a preset position of the corner point 1 and a preset position of the corner point 2. The terminal device may calculate the pose according to a perspective-2-point pose calculation algorithm (p2p) in combination with the gravity direction.

Specifically, the first pixel position may include pixel coordinates of a corner point 1 in the target image, pixel coordinates of a corner point 2 in the target image, pixel coordinates of a corner point 3 in the target image, and pixel coordinates of a corner point 4 in the target image. The third position information may include a preset position of the corner point 1, a preset position of the corner point 2, a preset position of the corner point 3, and a preset position of the corner point 4. The terminal device may calculate the pose according to a perspective-n-point pose calculation algorithm (pnp).

In this embodiment of this disclosure, the pose information may include a coordinate position in which the terminal device is located during photographing of the target image. The terminal device may perform route planning based on the coordinate position, to obtain a planned route. A start point or an end point of the planned route is the coordinate position.

In this embodiment of this disclosure, the terminal device may display a two-dimensional navigation interface. The two-dimensional navigation interface includes the planned route.

In this embodiment of this disclosure, the pose information may include a yaw angle, a pitch angle, and a roll angle of the terminal device during photographing of the target image. The terminal device may display an AR navigation interface. The AR navigation interface includes a navigation guidance and an image of an environment including the current terminal device. The navigation guidance is determined based on a coordinate position, the yaw angle, the pitch angle, and the roll angle of the terminal device.

2. The server determines the pose information based on the first pixel position and the third position information, where the target image is photographed by the terminal, and the pose information indicates a corresponding pose of the terminal during photographing of the target image.

In an embodiment, the terminal device obtains the target image; obtains the target parking space mark included in the target image and a first pixel position that is of the target parking space line corresponding to the target parking space mark and that is in the target image; obtains the third position information corresponding to the target parking space line, where the third position information indicates preset position information of the target parking space line in a digital map; and sends the first pixel position and the third position information to a server. The server may determine the pose information based on the first pixel position and the third position information, where the target image is photographed by the terminal, and the pose information indicates the corresponding pose of the terminal during photographing of the target image.

In an embodiment, the terminal device obtains the target image, obtains the target parking space mark included in the target image and a first pixel position that is of the target parking space line corresponding to the target parking space mark and that is in the target image, and sends the target parking space mark included in the target image to the server. The server may obtain the third position information corresponding to the target parking space line, where the third position information indicates preset position information of the target parking space line in a digital map; and determine the pose information based on the first pixel position and the third position information, where the target image is photographed by the terminal, and the pose information indicates the corresponding pose of the terminal during photographing of the target image.

In an embodiment, the terminal device obtains the target image, and sends the obtained target image to the server. The server may determine the target parking space mark included in the target image and a first pixel position that is of the target parking space line corresponding to the target parking space mark and that is in the target image; obtain the third position information corresponding to the target parking space line; and determine the pose information based on the first pixel position and the third position information. The third position information indicates preset position information of the target parking space line in a digital map. The target image is photographed by the terminal, and the pose information indicates the corresponding pose of the terminal during photographing of the target image.

In an embodiment, the terminal device obtains the target image, and sends the obtained target image to the server. The server may determine the target parking space mark included in the target image and a first pixel position that is of the target parking space line corresponding to the target parking space mark and that is in the target image, and send the target parking space mark included in the target image to the terminal device. The terminal device may obtain the third position information corresponding to the target parking space line, and send the third position information to a server. The third position information indicates preset position information of the target parking space line in the digital map. The server may determine the pose information based on the first pixel position and the third position information. The target image is photographed by the terminal, and the pose information indicates the corresponding pose of the terminal during photographing of the target image.

For details about how the server determines the pose information based on the first pixel position and the third position information, refer to the description in the foregoing embodiment. Details are not described herein again.

In this embodiment of this disclosure, after the terminal device obtains the pose information, or the server obtains the pose information and sends the pose information to the terminal device, the terminal device may further obtain a pose change of the terminal device, and determine a real-time pose based on the pose information and the obtained pose change of the terminal device.

In this embodiment of this disclosure, the terminal device may use the obtained pose information as an initial pose, determine the pose change of the terminal device by using a simultaneous localization and mapping (slam) tracking technology, and determine the real-time pose based on the initial pose and the pose change of the terminal. The terminal device may perform processing such as navigation, route planning, and obstacle avoidance based on the real-time pose. For example, the terminal device performs route planning based on the coordinate position to obtain a planned route, where a start point or an end point of the planned route is the coordinate position; and displays a two-dimensional navigation interface, where the two-dimensional navigation interface includes the planned route; or displays an AR navigation interface, where the AR navigation interface includes a navigation guidance and an image of an environment including the current terminal device, where the navigation guidance is determined based on a yaw angle, a pitch angle, and a roll angle of the terminal device.

Optionally, in addition to performing processing such as navigation, route planning, and obstacle avoidance based on the real-time pose, after obtaining the pose information, the terminal device may further obtain a preview stream of a current scenario; determine, based on the pose information, preset media content included in a digital map corresponding to a scenario in the preview stream; and render the media content in the preview stream.

In this implementation of this disclosure, if the terminal device is a mobile phone, an AR wearable device, or the like, a virtual scenario may be constructed based on the pose information. First, the terminal device may obtain the preview stream of the current scenario. For example, the user may photograph a preview stream of a current environment in a shopping mall. Then, the terminal device may determine the pose information as the initial pose according to the method mentioned above. Then, the terminal device may obtain a digital map. The digital map records three-dimensional coordinates of each position in the world coordinate system. Corresponding preset media content exists in a preset three-dimensional coordinate position. The terminal may determine, in the digital map, target three-dimensional coordinates corresponding to a real-time pose. If corresponding preset media content exists at the target three-dimensional coordinates, the terminal obtains the preset media content. For example, the user photographs a target shop, and the terminal recognizes a real-time pose and determines that a camera is currently photographing the target shop. In this case, preset media content corresponding to the target shop may be obtained. The preset media content corresponding to the target shop may be description information of the target shop, for example, specific commodities in the target shop that are worth purchasing. Based on this, the terminal may render the media content in the preview stream. In this case, the user may view, within a preset area near the image corresponding to the target shop in the mobile phone, the preset media content corresponding to the target shop. After viewing the preset media content corresponding to the target shop, the user may have a general understanding of the target shop.

Different digital maps may be set for different places. In this way, when the user moves to another place, preset media content corresponding to a real-time pose may also be obtained based on a media content rendering manner provided in this embodiment of the present disclosure, and the media content is rendered in the preview stream.

Embodiments of this disclosure provide the pose determining method, including: obtaining the target image, where the target image includes the target parking space mark and the target parking space line, and the target parking space corresponding to the target parking space mark includes the target parking space line; and determining the pose information based on the target parking space mark and the target parking space line, where the pose information indicates the corresponding pose of the terminal during photographing of the target image. In the foregoing manner, when positioning precision of a GPS signal is poor, the terminal device may determine the pose information based on the target parking space mark and the target parking space line, to implement positioning. In addition, compared with a manner in which positioning is performed based on a 3D point cloud, in embodiments, the map includes less data.

Refer to FIG. 6b. FIG. 6b is a schematic diagram of a pose determining method according to an embodiment of this disclosure. As shown in FIG. 6b, the pose determining method provided in this disclosure includes the following steps.

604: Obtain a first pixel position of a target parking space line in a target image, where the target image includes a target parking space mark and a target parking space line, and a target parking space corresponding to the target parking space mark includes the target parking space line.

605: Obtain third position information corresponding to the target parking space line in a digital map, where the third position information indicates a coordinate position of the target parking space line in the digital map, the digital map includes second position information corresponding to the target parking space mark, and the second position information includes the third position information.

606: Determine pose information based on the first pixel position and the third position information, where the target image is photographed by the terminal device, and the pose information indicates a corresponding pose of the terminal during photographing of the target image.

For description of step 604 to step 606, refer to the description of the server side in step 301 and step 302 in the foregoing embodiment. Details are not described herein again.

Optionally, a server may receive the target image sent by the terminal device, and determine the first pixel position of the target parking space line in the target image.

Optionally, the server may receive the first pixel position that is of the target parking space line in the target image and that is sent by the terminal device.

Optionally, the server may receive the target image or the target parking space mark sent by the terminal device; and determine, from the digital map, the third position information corresponding to the target parking space line.

Optionally, the server may receive the third position information that corresponds to the target parking space line in the digital map and that is sent by the terminal device.

Optionally, the target parking space line includes a first parking space line, a second parking space line, and a third parking space line. At least two of the first parking space line, the second parking space line, and the third parking space line are not parallel in the digital map, and a first corner point is an intersection point of the first parking space line and the second parking space line. The server may determine the pose information based on the first pixel position and the third position information.

The first pixel position includes direction information of the first parking space line, the second parking space line, and the third parking space line in the target image, and the third position information includes preset directions corresponding to the first parking space line, the second parking space line, and the third parking space line in the digital map; or the first pixel position includes direction information of the first parking space line and the second parking space line in the target image, and a pixel position of the first corner point in the target image; and the third position information includes preset directions corresponding to the first parking space line and the second parking space line in the digital map, and a preset position corresponding to the first corner point in the digital map.

Optionally, the server may receive a gravity direction that is of the terminal device during photographing of the target image and that is sent by the terminal device;

determine the pose information based on the first pixel position, the third position information, and the gravity direction.

Optionally, the server may determine a 2D-3D correspondence between the first pixel position and the third position information, where the 2D-3D correspondence indicates a correspondence between two-dimensional coordinates of the target parking space line in the target image and three-dimensional coordinates of the target parking space line in actual space; and determine the pose information based on the 2D-3D correspondence.

Refer to FIG. 7a. FIG. 7a is a schematic diagram of a pose determining method according to an embodiment of this disclosure. As shown in FIG. 7a, the pose determining method provided in this disclosure includes the following steps.

801: Obtain a target image, where the target image includes a target parking space mark.

For description of step 801, refer to the description of step 301 in the foregoing embodiment. Details are not described herein again.

802: Determine pose information based on the target parking space mark and a first pixel position that is of a circumscribed pattern of the target parking space mark and that is in the target image, where the target image is photographed by a terminal, and the pose information indicates a corresponding pose of the terminal during photographing of the target image.

In this embodiment of this disclosure, the circumscribed pattern may be a circumscribed rectangular frame, a circumscribed polygonal frame, or the like. For example, the circumscribed pattern is a circumscribed rectangular frame. The terminal device may obtain a first pixel position that is of the circumscribed rectangular frame of the target parking space mark and that is in the target image, obtain third position information corresponding to the circumscribed rectangular frame in a digital map, and determine the pose information based on the first pixel position and the third position information.

In this embodiment of this disclosure, the first pixel position may include a pixel position of the circumscribed rectangular frame that is of the target parking space mark and that is in the target image. The target parking space mark is usually printed at the front end of the parking space, for example, the target parking space mark 401 shown in FIG. 4*a* and FIG. 4*b*.

In this embodiment of this disclosure, the first pixel position may include a pixel position of a second corner point of a circumscribed rectangular frame that is of the target parking space mark and that is in the target image, or the first pixel position includes direction information of an edge line of a circumscribed rectangular frame that is of the target parking space mark and that is in the target image.

Figure 5:
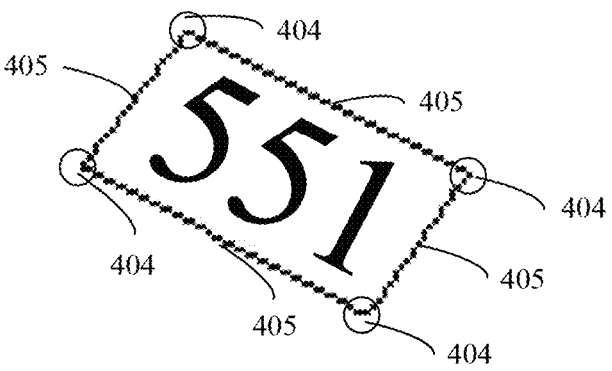
FIG. 5 is a schematic diagram of a target parking space mark according to an embodiment of this disclosure.

In this embodiment of this disclosure, the terminal device may recognize a position of the target parking space mark in the target image, and obtain a circumscribed rectangular frame of the target parking number. The circumscribed rectangular frame is circumscribed at the periphery of the target parking space mark. Refer to FIG. 5. FIG. 5 is a schematic diagram of the target parking space mark according to this embodiment of this disclosure. As shown in FIG. 5, a circumscribed rectangle of an area in which the target parking space mark is located may include four corner points 404. The second corner point in this embodiment is one of the four corner points 404. The circumscribed rectangle of the area in which the target parking space mark is located may include four edge lines 405. The first edge line in this embodiment is one of the four edge lines 405.

In this embodiment of this disclosure, the third position information corresponding to the circumscribed rectangular frame may be obtained, where the third position information indicates preset position information of the circumscribed rectangular frame of the target parking space mark.

In this embodiment of this disclosure, the third position information may include a preset position corresponding to the circumscribed rectangular frame of the target parking space mark. Refer to FIG. 6*a*. FIG. 6*a* is a schematic diagram of a map according to this embodiment of this disclosure. As shown in FIG. 6*a*, the map includes corner points 603 of a circumscribed rectangular frame, edge lines of the circumscribed rectangular frame, and the like.

The pose information is determined based on the first pixel position and the third position information. The target image is photographed by the terminal, and the pose information indicates a corresponding pose of the terminal during photographing of the target image.

In this embodiment of this disclosure, a pose may be determined according to a 2D-3D coordinate matching algorithm based on the first pixel position and the third position information.

Specifically, the first pixel position may include at least direction information of a feature line 1 in the target image, direction information of a feature line 2 in the target image, and direction information of a feature line 3 in the target image. The third position information may include a preset direction of the feature line 1, a preset direction of the feature line 2, and a preset direction of the feature line 3. The terminal device may calculate the pose through 2D-3D matching of at least three detected lines (including both a horizontal line and a vertical line) according to a perspective-n-line pose calculation algorithm (PnL).

Specifically, the first pixel position may include pixel coordinates of a corner point 1 in the target image, pixel coordinates of a corner point 2 in the target image, and a gravity direction. The third position information may include a preset position of the corner point 1 and a preset position of the corner point 2. The terminal device may calculate the pose according to a perspective-2-point pose calculation algorithm (p2p) and a gravity direction algorithm.

Specifically, the first pixel position may include pixel coordinates of a corner point 1 in the target image, pixel coordinates of a corner point 2 in the target image, pixel coordinates of a corner point 3 in the target image, and pixel coordinates of a corner point 4 in the target image. The third position information may include a preset position of the corner point 1, a preset position of the corner point 2, a preset position of the corner point 3, and a preset position of the corner point 4. The terminal device may calculate the pose according to a perspective-n-point pose calculation algorithm (pnp).

It should be noted that the foregoing corner points are intersection points of circumscribed rectangular frames of the target parking space mark, and the feature lines are edge lines of the circumscribed rectangular frames of the target parking space mark.

Optionally, the terminal device may display a parking space mark input indication box, and obtain the target parking space mark input in the parking space mark input indication box.

Optionally, the pose information includes a coordinate position of the terminal device during photographing of the target image. The terminal device may perform route planning based on the coordinate position, to obtain a planned route, where a start point or an end point of the planned route is the coordinate position; and display a two-dimensional navigation interface, where the two-dimensional navigation interface includes the planned route.

Optionally, the pose information includes a coordinate position, a yaw angle, a pitch angle, and a roll angle of the terminal device during photographing of the target image. The terminal device may display an AR navigation interface, where the AR navigation interface includes a navigation guidance and an image of an environment including the current terminal device, and the navigation guidance is determined based on the coordinate position, the yaw angle, the pitch angle, and the roll angle of the terminal device.

Optionally, the terminal device may obtain positioning information used when the terminal device photographs the target image. The obtaining third position information corresponding to the target parking space line in a digital map includes: obtaining, from the digital map, the third position information that corresponds to the circumscribed rectangular frame and that matches the positioning information.

Optionally, the circumscribed pattern includes a first edge line, a second edge line, and a third edge line. At least two of the first edge line, the second edge line, and the third edge line are not parallel in the digital map, and a second corner point is an intersection point of the first edge line and the second edge line.

The first pixel position includes direction information of the first edge line, the second edge line, and the third edge line in the target image, and the third position information includes preset directions corresponding to the first edge line, the second edge line, and the third edge line in the digital map; or the first pixel position includes direction information of the first edge line and the second edge line in the target image, and a pixel position of the second corner point in the target image; and the third position information includes preset directions corresponding to the first edge line and the second edge line in the digital map, and a preset position corresponding to the second corner point in the digital map.

Optionally, the terminal device may obtain a gravity direction of the terminal device during photographing of the target image, and determine the pose information based on the first pixel position, the third position information, and the gravity direction.

Optionally, the terminal device may determine a 2D-3D correspondence between the first pixel position and the third position information, and determine the pose information based on the 2D-3D correspondence.

In this embodiment of this disclosure, step 802 may be performed by the terminal device or step 802 may be performed through interaction between the terminal device and the server.

In this embodiment of this disclosure, the terminal device may obtain the first pixel position, in the target image, of the circumscribed rectangular frame of the target parking space mark; obtain the third position information corresponding to the target parking space line in the digital map, where the third position information indicates the position information that is of the circumscribed rectangular frame of the target parking space mark and that is in the digital map; and determine the pose information based on the first pixel position and the third position information.

In this embodiment of this disclosure, the terminal device may send the target image to the server, and receive the pose information determined by the server based on the target image. The pose information is determined by the server based on the first pixel position that is of the circumscribed rectangular frame of the target parking space mark and that is in the target image, and the third position information corresponding to the target parking space line in the digital map, and the third position information indicates position information that is of the circumscribed rectangular frame of the target parking space mark and that is in the digital map.

In this embodiment of this disclosure, the terminal device may obtain the first pixel position that is of the circumscribed rectangular frame of the target parking space mark and that is in the target image, send the target parking space mark and the first pixel position to a server, and receive the pose information determined by the server based on the target parking space mark and the first pixel position. The pose information is determined by the server based on the first pixel position and third position information corresponding to the target parking space line in the digital map, and the third position information indicates position information that is of the circumscribed rectangular frame of the target parking space mark and that is in the digital map.

In this embodiment of this disclosure, the terminal device may obtain the third position information corresponding to the target parking space line in the digital map, where the third position information indicates position information that is of the circumscribed rectangular frame of the target parking space mark and that is in the digital map; send the target image and the third position information to a server; and receive the pose information determined by the server based on the target image and the third position information, where the pose information is determined by the server based on the third position information and the first pixel position that is of the circumscribed rectangular frame of the target parking space mark and that is in the target image.

In this embodiment of this disclosure, the terminal device may obtain the direction information of the first edge line and a pixel position, in the target image, of a second corner point of a circumscribed rectangular frame of the area in which the target parking space mark is located. For a specific manner of representing the pixel position of the second corner point and the direction information of the first edge line, refer to the description in the foregoing embodiment. Details are not described herein again.

In a scenario, after completing parking, the user needs to search for an exit of a garage, an elevator entrance or a staircase entrance for entering a ground floor, or the like. Generally, the user may look at an exit sign indication in the garage. However, no obvious exit sign indication may be found near the parked vehicle. To resolve the foregoing problem, the following describes a pose determining method. Refer to FIG. 7b. FIG. 7b is a schematic flowchart of a pose determining method according to an embodiment of this disclosure. As shown in FIG. 7b, the pose determining method provided in this embodiment includes the following steps.

701: Receive a first navigation instruction, where the first navigation instruction is used to instruct to perform navigation to a preset coordinate position.

Figure 8A:
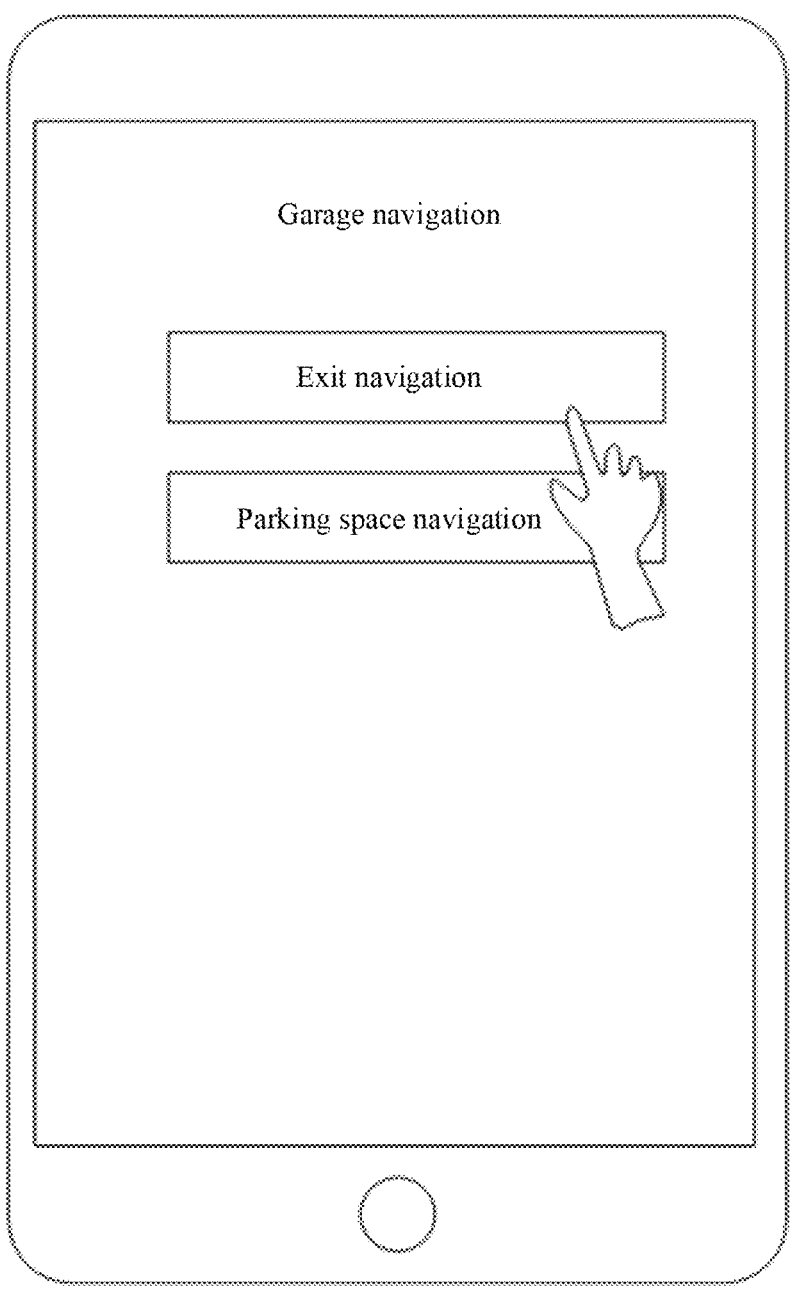
FIG. 8*a* to FIG. 8*d* are schematic diagrams of interfaces of a terminal device according to an embodiment of this disclosure.

In this embodiment of this disclosure, a map prestored in a terminal device may include a preset coordinate position of a garage exit. The preset coordinate position in this embodiment of this disclosure may be position coordinates of the exit. Refer to FIG. 8a to FIG. 8d. FIG. 8a to FIG. 8d are schematic diagrams of interfaces of a terminal device according to an embodiment of this disclosure. As shown in FIG. 8a, the terminal device may display a control for instructing exit navigation. A user may tap the control. Accordingly, this is equivalent to that the terminal device receives the first navigation instruction, where the first navigation instruction is used to instruct to perform navigation to the preset coordinate position.

702: Display a target photographing interface.

Figure 8B:
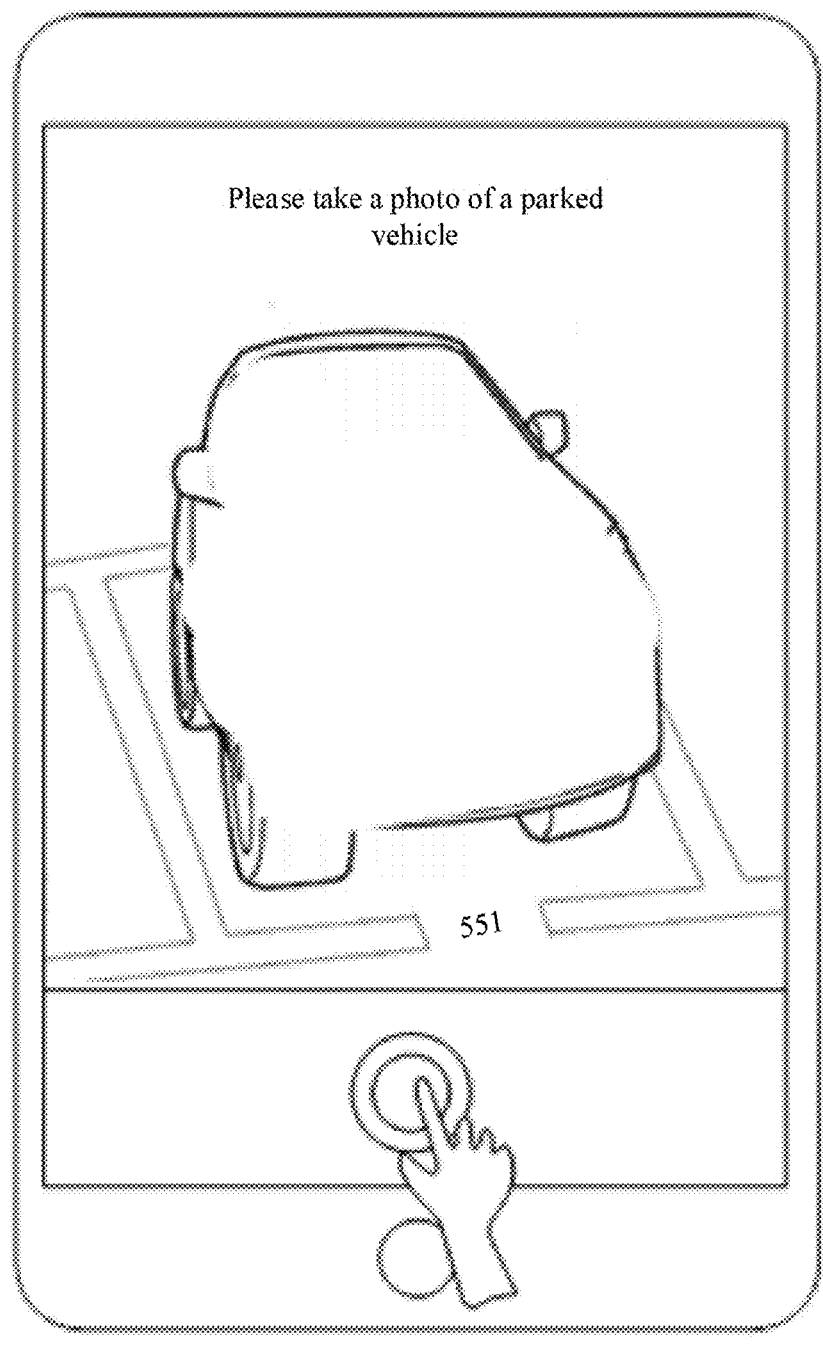
Figure 8C:
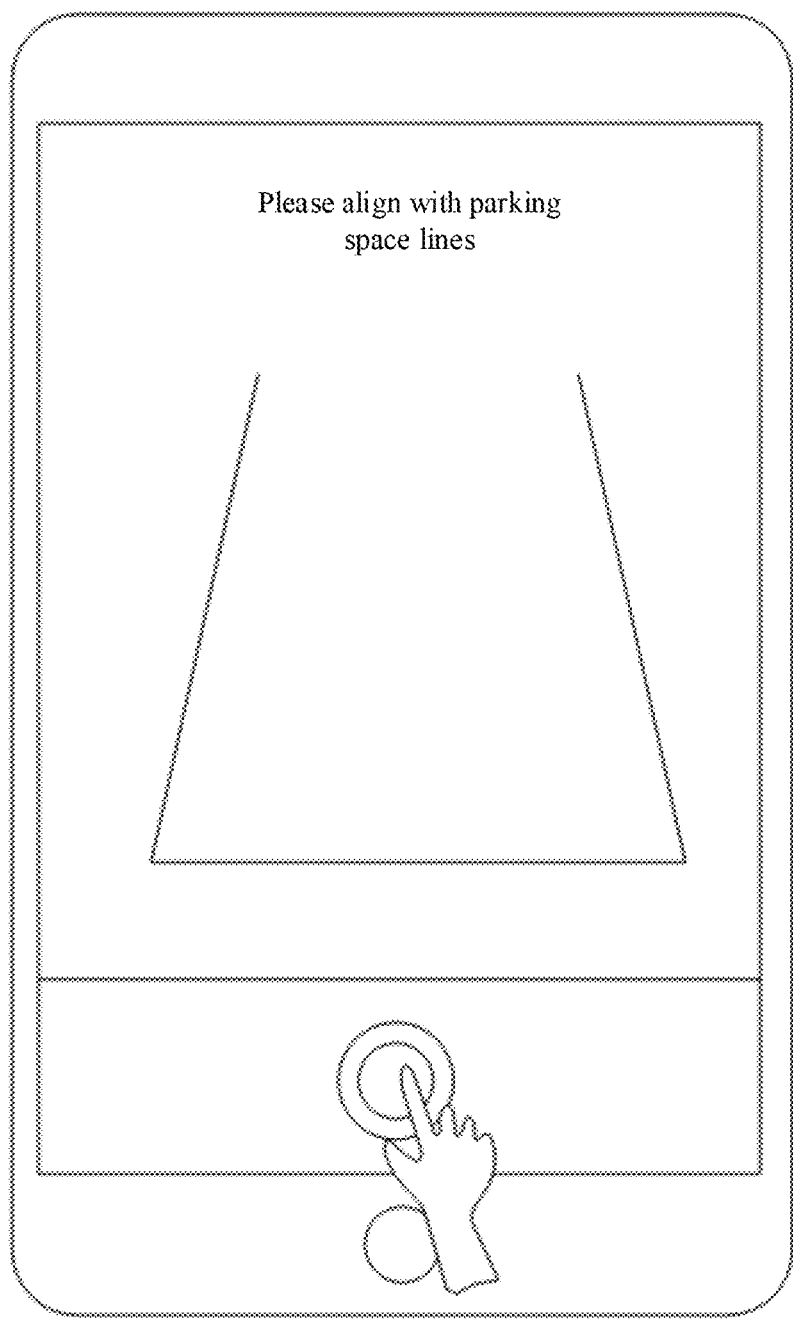

In this embodiment of this disclosure, as shown in FIG. 8b, the target photographing interface may include a photographing area. As shown in FIG. 8c, the photographing area may further include a preset guide contour and a guide prompt (which may be but not limited to a prompt "Please align with parking space lines" shown in FIG. 8c). The guide prompt is used to indicate to move a target parking space in the photographing area to be within the preset guide contour or a position difference between the target parking space and the preset guide contour falls within a preset range. If a target parking space in the photographing area is located within the preset guide contour or a position difference between a target parking space in the photographing area and the preset guide contour falls within a preset range, the target image is obtained through photographing.

703: Perform a preset step on the target image to obtain pose information.

The pose information includes a coordinate position of the terminal device during photographing of the target image, and a yaw angle, a pitch angle, a roll angle, and the like of the terminal device during photographing of the target image.

For specific description of step 703, refer to the description of step 301 to step 304 in the foregoing embodiment. Details are not described herein again.

704: Perform route planning based on the pose information to obtain a planned route, where a start point of the planned route is the coordinate position, and an end point of the planned route is the preset coordinate position.

In this embodiment of this disclosure, after coordinates of a current position of the terminal device are obtained, route planning may be performed based on the coordinates of the current position of the terminal device and the coordinate position of the exit position of the garage, to obtain a planned route.

705: Display an AR navigation interface, where the AR navigation interface includes a navigation guidance and an image of an environment including the current terminal device, and the navigation guidance is determined based on the yaw angle, the pitch angle, and the roll angle of the terminal device.

In this embodiment of this disclosure, the terminal device may display the AR navigation interface. The AR navigation interface includes the navigation guidance and the image of the environment in which the terminal device is currently located. Refer to the upper half interface in FIG. 8d. The AR navigation interface shown on the upper half interface in FIG. 8d includes the navigation guidance and the image of the environment in which the terminal device is currently located.

706: Display a two-dimensional navigation interface, where the two-dimensional navigation interface includes the planned route.

In this embodiment of this disclosure, the terminal device may display the two-dimensional navigation interface. The two-dimensional navigation interface includes the planned route. Refer to the lower half interface in FIG. 8d. The two-dimensional navigation interface shown on the lower half interface in FIG. 8d includes the planned route.

Figure 8D:
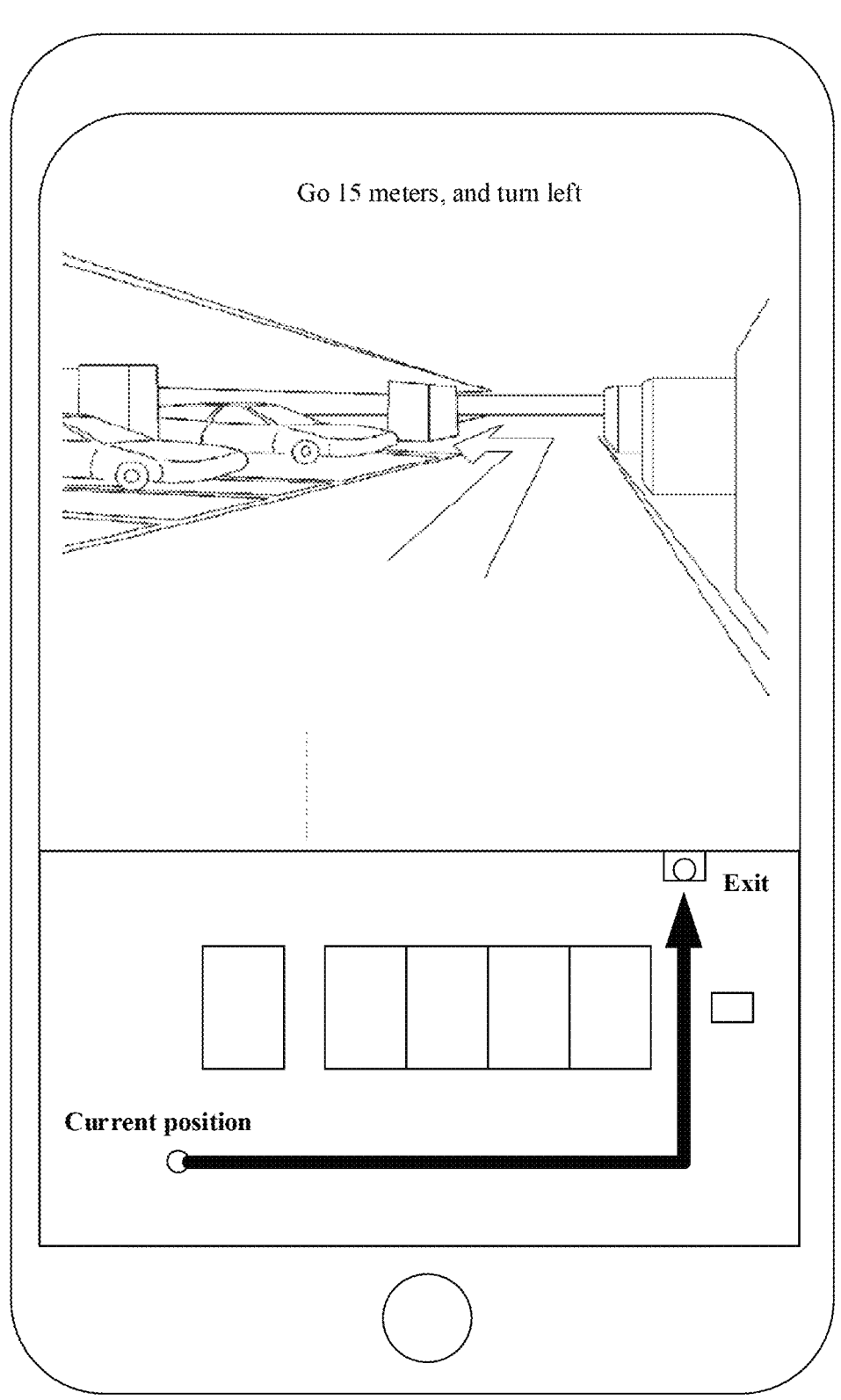

It should be noted that step 705 and step 706 may be simultaneously performed to obtain the interface including both the AR navigation interface and the two-dimensional navigation interface in FIG. 8d, or a similar interface including both an AR navigation interface and a two-dimensional navigation interface. Only one of step 705 and step 706 may be performed. When step 705 is performed, the terminal device may display the AR navigation interface. When step 706 is performed, the terminal device may display the two-dimensional navigation interface.

It should be noted that content included in the interfaces in FIG. 8a to FIG. 8d is merely an example, and is not limited in this disclosure.

Refer to FIG. 8e. FIG. 8e is a schematic diagram of a pose determining method according to an embodiment of this disclosure. As shown in FIG. 8e, the pose determining method provided in this disclosure includes the following steps.

803: Obtain a first pixel position that is of a circumscribed pattern of a target parking space mark and that is in a target image, where the target image includes the target parking space mark.

804: Obtain third position information corresponding to the circumscribed pattern in a digital map, where the third position information indicates a coordinate position of the circumscribed pattern in the digital map, the digital map includes second position information corresponding to the target parking space mark, and the second position information includes the third position information.

805: Determine pose information based on the first pixel position and the third position information.

Optionally, the server is further configured to: receive the target image sent by the terminal device; and determine a first pixel position that is of a circumscribed rectangular frame of the target parking space mark and that is in the target image.

Optionally, the server is further configured to receive the first pixel position that is of the circumscribed rectangular frame of the target parking space mark and is in the target image, and that is sent by the terminal device.

Optionally, the server is further configured to receive the target image or the target parking space mark sent by the terminal device; and determine, from the digital map, the second position information corresponding to the target parking space mark.

Optionally, the server is further configured to receive the third position information that corresponds to the target parking space line in the digital map and that is sent by the terminal device.

Optionally, the circumscribed pattern includes a first edge line, a second edge line, and a third edge line. At least two of the first edge line, the second edge line, and the third edge line are not parallel in the digital map, and a second corner point is an intersection point of the first edge line and the second edge line. The server is further configured to:

determine the pose information based on the first pixel position and the third position information.

The first pixel position includes direction information of the first edge line, the second edge line, and the third edge line in the target image, and the third position information includes preset directions corresponding to the first edge line, the second edge line, and the third edge line in the digital map; or the first pixel position includes direction information of the first edge line and the second edge line in the target image, and a pixel position of the second corner point in the target image; and the third position information includes preset directions corresponding to the first edge line and the second edge line in the digital map, and a preset position corresponding to the second corner point in the digital map.

Optionally, the server is further configured to: obtain a gravity direction of the terminal device during photographing of the target image, and determine the pose information based on the first pixel position, the second position information, and the gravity direction.

Optionally, the server is further configured to determine a 2D-3D correspondence between the first pixel position and the third position information; and determine the pose information based on the 2D-3D correspondence.

Figure 9:
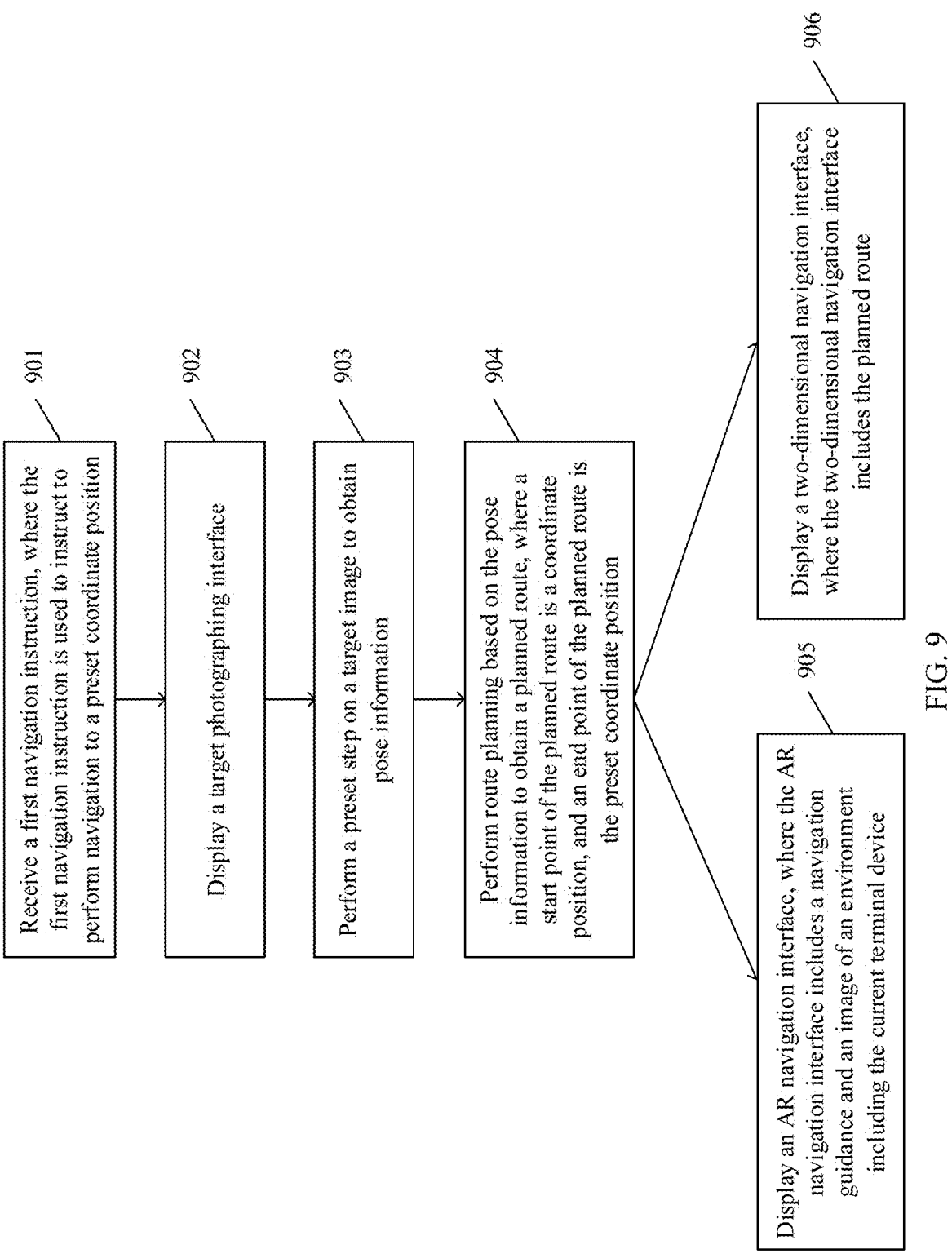
FIG. 9 is a schematic flowchart of a pose determining method according to an embodiment of this disclosure.

In a scenario, after entering a garage again, the user needs to search for a previously parked vehicle. To resolve the foregoing problem, the following describes a pose determining method. Refer to FIG. 9. FIG. 9 is a schematic flowchart of a pose determining method according to an embodiment of this disclosure. As shown in FIG. 9, the pose determining method provided in this embodiment includes the following steps.

901: Receive a first navigation instruction, where the first navigation instruction is used to instruct to perform navigation to a preset coordinate position.

Figure 10A:
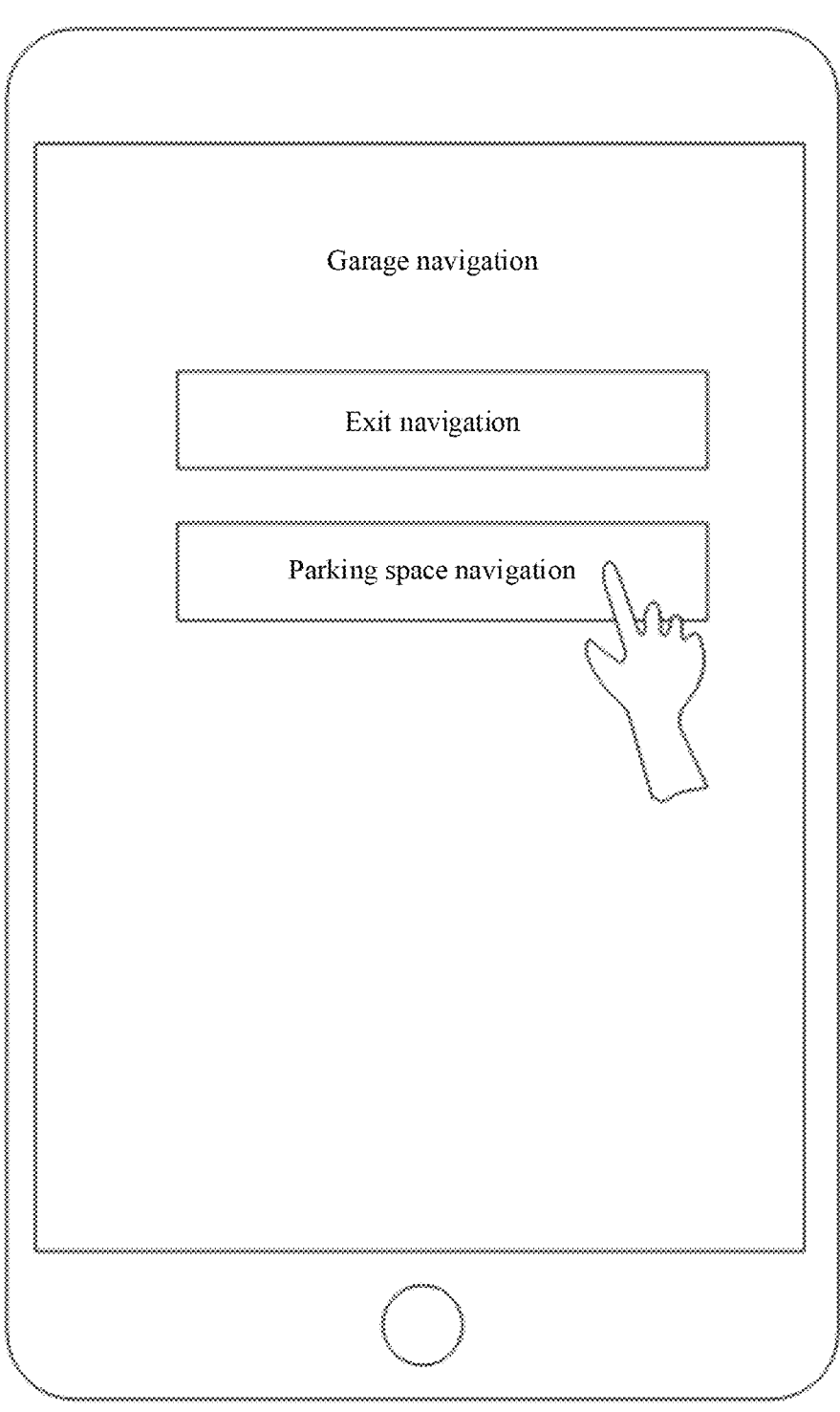
FIG. 10*a* and FIG. 10*b* are schematic diagrams of interfaces of a terminal device according to an embodiment of this disclosure.
Figure 10B:
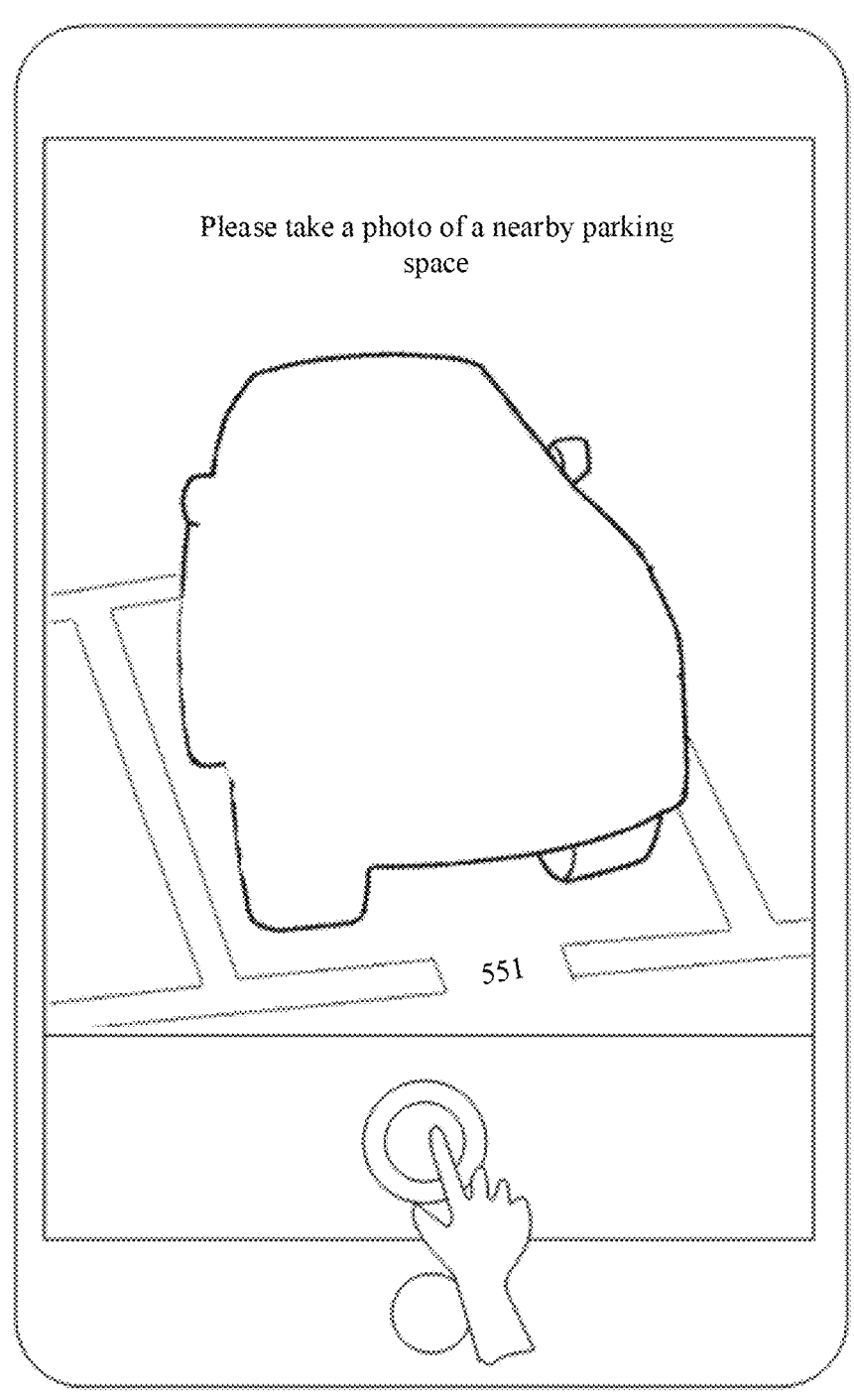

In this embodiment of this disclosure, the preset coordinate position may be a parking position of a user. Refer to FIG. 10a and FIG. 10b. FIG. 10a and FIG. 10b are schematic diagrams of interfaces of a terminal device according to an embodiment of this disclosure. As shown in FIG. 10a, the terminal device may display a control for instructing parking space navigation. A user may tap the control. Accordingly, this is equivalent to that the terminal device receives the first navigation instruction, where the first navigation instruction is used to instruct to perform navigation to the preset coordinate position.

902: Display a target photographing interface.

In this embodiment of this disclosure, as shown in FIG. 10b, the target photographing interface may include a photographing area. For specific description of step 902, refer to the description of step 702 in the foregoing embodiment. Details are not described herein again.

903: Perform a preset step on the target image to obtain first pose information.

The first pose information includes a coordinate position of the terminal device during photographing of the target image, and a yaw angle, a pitch angle, a roll angle, and the like of the terminal device during photographing of the target image.

For specific description of step 903, refer to the description of step 301 to step 304 in the foregoing embodiment. Details are not described herein again.

904: Perform route planning based on the pose information to obtain a planned route, where a start point of the planned route is the coordinate position, and an end point of the planned route is the preset coordinate position.

In this embodiment of this disclosure, after a vehicle parks, the terminal device may obtain, but not limited to, pose information of the terminal device during parking based on step 301 to step 304. After coordinates of a current position of the terminal device are obtained, route planning may be performed based on the coordinates of the current position of the terminal device and the pose information of the terminal device during parking, to obtain a planned route.

905: Display an AR navigation interface, where the AR navigation interface includes a navigation guidance and an image of an environment including the current terminal device, and the navigation guidance is determined based on the yaw angle, the pitch angle, and the roll angle of the terminal device.

906: Display a two-dimensional navigation interface, where the two-dimensional navigation interface includes the planned route.

For specific description of step 905 and step 906, refer to the description of step 705 and step 706 in the foregoing embodiment. Details are not described herein again.

Figure 11:
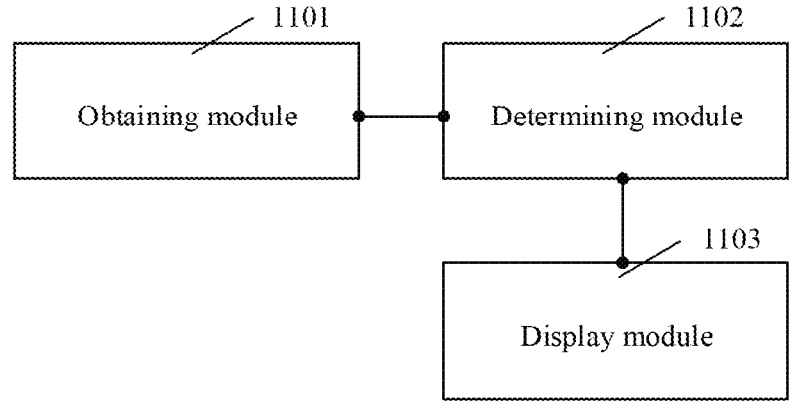
FIG. 11 is a schematic diagram of a structure of a pose determining apparatus according to an embodiment of this disclosure.

This disclosure further provides a pose determining apparatus. The pose determining apparatus may be a terminal device. Refer to FIG. 11. FIG. 11 is a schematic diagram of a structure of a pose determining apparatus according to an embodiment of this disclosure. As shown in FIG. 11, the pose determining apparatus includes:

an obtaining module 1101, configured to obtain a target image, where the target image includes a target parking space mark and a target parking space line, and a target parking space corresponding to the target parking space mark includes the target parking space line; and a determining module 1102, configured to determine pose information based on the target parking space mark and the target parking space line, where the target image is photographed by a terminal device, and the pose information indicates a corresponding pose of the terminal during photographing of the target image.

Optionally, the determining module 1102 is specifically configured to:

obtain a first pixel position of the target parking space line in the target image;

obtain third position information corresponding to the target parking space line in a digital map, where the third position information indicates a coordinate position of the target parking space line in the digital map, the digital map includes second position information corresponding to the target parking space mark, and the second position information includes the third position information; and determine the pose information based on the first pixel position and the third position information.

Optionally, the determining module 1102 is specifically configured to:

send the target image to a server; and receive the pose information sent by the server, where the pose information is determined by the server based on a first pixel position of the target parking space line in the target image and third position information corresponding to the target parking space line in a digital map.

Optionally, the determining module 1102 is specifically configured to:

obtain a first pixel position of the target parking space line in the target image;

send the target parking space mark and the first pixel position to a server; and receive the pose information sent by the server, where the pose information is determined by the server based on the first pixel position and third position information corresponding to the target parking space line in a digital map.

Optionally, the determining module 1102 is specifically configured to:

obtain third position information corresponding to the target parking space line in a digital map, where the third position information indicates position information of the target parking space line in the digital map;

send the target image and the third position information to a server; and receive the pose information sent by the server, where the pose information is determined by the server based on the third position information and a first pixel position of the target parking space line in the target image.

Optionally, the obtaining module 1101 is specifically configured to:

display a target photographing interface, where the target photographing interface includes a photographing area, and the photographing area includes a preset guide contour; and obtain, through photographing, the target image if the target parking space in the photographing area is located within the preset guide contour or a position difference between a target parking space in the photographing area and the preset guide contour falls within a preset range.

The determining module is specifically configured to:

obtain a pixel position of the preset guide contour in the target image.

Optionally, the apparatus further includes:

a display module 1103, configured to display a parking space mark input indication box.

The obtaining module 1101 is further configured to obtain the target parking space mark input in the parking space mark input indication box.

Optionally, the pose information includes a coordinate position of the terminal device during photographing of the target image.

The apparatus further includes:

a route planning module, configured to perform route planning based on the coordinate position to obtain a planned route, where a start point or an end point of the planned route is the coordinate position.

The display module 1103 is further configured to display a two-dimensional navigation interface, where the two-dimensional navigation interface includes the planned route.

Optionally, the pose information includes a coordinate position, a yaw angle, a pitch angle, and a roll angle of the terminal device during photographing of the target image.

The display module 1103 is further configured to display an AR navigation interface, where the AR navigation interface includes a navigation guidance and an image of an environment including the current terminal device, and the navigation guidance is determined based on the coordinate position, the yaw angle, the pitch angle, and the roll angle of the terminal device.

Optionally, the determining module is specifically configured to:

obtain positioning information of the terminal device during photographing of the target image; and obtain, from the digital map, the third position information that matches the positioning information and that corresponds to the target parking space line in the digital map.

Optionally, the target parking space line includes a first parking space line, a second parking space line, and a third parking space line. At least two of the first parking space line, the second parking space line, and the third parking space line are not parallel in the digital map, and a first corner point is an intersection point of the first parking space line and the second parking space line. The first pixel position includes direction information of the first parking space line, the second parking space line, and the third parking space line in the target image, and the third position information includes preset directions corresponding to the first parking space line, the second parking space line, and the third parking space line in the digital map; or the first pixel position includes direction information of the first parking space line and the second parking space line in the target image, and a pixel position of the first corner point in the target image; and the third position information includes preset directions corresponding to the first parking space line and the second parking space line in the digital map, and a preset position corresponding to the first corner point in the digital map.

Optionally, the determining module is specifically configured to:

obtain a gravity direction of the terminal device during photographing of the target image; and determine the pose information based on the first pixel position, the third position information, and the gravity direction.

Optionally, the determining module 1102 is specifically configured to:

determine a 2D-3D correspondence between the first pixel position and the third position information; and determine the pose information based on the 2D-3D correspondence.

This disclosure further provides a pose determining apparatus. The pose determining apparatus may be a terminal device. Refer to FIG. 11. FIG. 11 is a schematic diagram of a structure of a pose determining apparatus according to an embodiment of this disclosure. As shown in FIG. 11, the pose determining apparatus includes:

an obtaining module 1101, configured to obtain a target image, where the target image includes a target parking space mark; and a determining module 1102, configured to determine pose information based on the target parking space mark and a first pixel position that is of a circumscribed pattern of the target parking space mark and that is in the target image, where the target image is photographed by a terminal, and the pose information indicates a corresponding pose of the terminal during photographing of the target image.

Optionally, the determining module 1102 is specifically configured to:

obtain the first pixel position that is of the circumscribed pattern of the target parking space mark and that is in the target image;

obtain third position information corresponding to the circumscribed pattern in a digital map, where the third position information indicates a coordinate position of the circumscribed pattern in the digital map; and determine the pose information based on the first pixel position and the third position information.

Optionally, the determining module 1102 is specifically configured to:

send the target image to a server; and receive the pose information determined by the server based on the target image, where the pose information is determined by the server based on a first pixel position that is of a circumscribed rectangular frame of the target parking space mark and that is in the target image, and third position information corresponding to the target parking space line in the digital map; and the third position information indicates position information that is of the circumscribed rectangular frame of the target parking space mark and that is in the digital map.

Optionally, the determining module 1102 is specifically configured to:

obtain the first pixel position that is of the circumscribed rectangular frame of the target parking space mark and that is in the target image;

send the target parking space mark and the first pixel position to a server; and receive the pose information that is determined by the server based on the target parking space mark and the first pixel position, where the pose information is determined by the server based on the first pixel position and third position information corresponding to the target parking space line in a digital map.

Optionally, the determining module 1102 is specifically configured to:

obtain third position information corresponding to the target parking space line in a digital map;

send the target image and the third position information to a server; and receive the pose information determined by the server based on the target image and the third position information, where the pose information is determined by the server based on the third position information and the first pixel position that is of the circumscribed rectangular frame of the target parking space mark and that is in the target image.

Optionally, the apparatus further includes:

a display module 1103, configured to display a parking space mark input indication box.

The obtaining module 1101 is further configured to obtain the target parking space mark input in the parking space mark input indication box.

Optionally, the pose information includes a coordinate position of the terminal device during photographing of the target image.

The apparatus further includes:

a route planning module 1104, configured to perform route planning based on the coordinate position to obtain a planned route, where a start point or an end point of the planned route is the coordinate position;

The display module 1103 is further configured to display a two-dimensional navigation interface, where the two-dimensional navigation interface includes the planned route.

Optionally, the pose information includes a coordinate position, a yaw angle, a pitch angle, and a roll angle of the terminal device during photographing of the target image.

The display module 1103 is further configured to display an AR navigation interface, where the AR navigation interface includes a navigation guidance and an image of an environment including the current terminal device, and the navigation guidance is determined based on the coordinate position, the yaw angle, the pitch angle, and the roll angle of the terminal device.

Optionally, the obtaining module 1101 is further configured to:

obtain positioning information of the terminal device during photographing of the target image; and the obtaining third position information corresponding to the target parking space line in a digital map includes: obtaining, from the digital map, third position information that corresponds to the target parking space mark and that matches the positioning information.

Optionally, the circumscribed pattern includes a first edge line, a second edge line, and a third edge line. At least two of the first edge line, the second edge line, and the third edge line are not parallel in a digital map, and a second corner point is an intersection point of the first edge line and the second edge line. The determining module is specifically configured to:

determine the pose information based on the first pixel position and the third position information.

The first pixel position includes direction information of the first edge line, the second edge line, and the third edge line in the target image, and the third position information includes preset directions corresponding to the first edge line, the second edge line, and the third edge line in the digital map; or the first pixel position includes direction information of the first edge line and the second edge line in the target image, and a pixel position of the second corner point in the target image; and the third position information includes preset directions corresponding to the first edge line and the second edge line in the digital map, and a preset position corresponding to the second corner point in the digital map.

Optionally, the determining module 1102 is specifically configured to:

obtain a gravity direction of the terminal device during photographing of the target image; and determine the pose information based on the first pixel position, the second position information, and the gravity direction.

Optionally, the determining module 1102 is specifically configured to:

determine a 2D-3D correspondence between the first pixel position and the third position information; and determine the pose information based on the 2D-3D correspondence.

Figure 12:
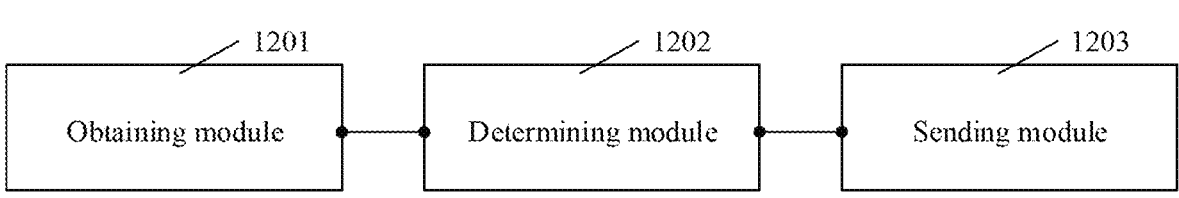
FIG. 12 is a schematic diagram of a structure of a pose determining apparatus according to an embodiment of this disclosure.

This disclosure further provides a pose determining apparatus. The pose determining apparatus may be a server. Refer to FIG. 12. FIG. 12 is a schematic diagram of a structure of a pose determining apparatus according to an embodiment of this disclosure. As shown in FIG. 12, the pose determining apparatus includes:

an obtaining module 1201, configured to obtain a first pixel position of a target parking space line in a target image, where the target image includes a target parking space mark and a target parking space line, and a target parking space corresponding to the target parking space mark includes the target parking space line; and obtain third position information corresponding to the target parking space line in a digital map, where the third position information indicates a coordinate position of the target parking space line in the digital map; and a determining module 1202, configured to determine pose information based on the first pixel position and the third position information, where the target image is photographed by a terminal device, and the pose information indicates a corresponding pose of the terminal during photographing of the target image.

Optionally, the obtaining module 1201 is specifically configured to:

receive the target image sent by the terminal device; and determine the first pixel position of the target parking space line in the target image.

Optionally, the obtaining module 1201 is specifically configured to:

receive the first pixel position that is of the target parking space line in the target image and that is sent by the terminal device.

Optionally, the obtaining module 1201 is specifically configured to:

receive the target image or the target parking space mark sent by the terminal device; and determine, from the digital map, the third position information corresponding to the target parking space line.

Optionally, the obtaining module 1201 is specifically configured to:

receive the third position information that corresponds to the target parking space line in the digital map and that is sent by the terminal device.

Optionally, the target parking space line includes a first parking space line, a second parking space line, and a third parking space line. At least two of the first parking space line, the second parking space line, and the third parking space line are not parallel in the digital map, and a first corner point is an intersection point of the first parking space line and the second parking space line. The determining module is specifically configured to:

determine the pose information based on the first pixel position and the third position information.

The first pixel position includes direction information of the first parking space line, the second parking space line, and the third parking space line in the target image, and the third position information includes preset directions corresponding to the first parking space line, the second parking space line, and the third parking space line in the digital map; or the first pixel position includes direction information of the first parking space line and the second parking space line in the target image, and a pixel position of the first corner point in the target image; and the third position information includes preset directions corresponding to the first parking space line and the second parking space line in the digital map, and a preset position corresponding to the first corner point in the digital map.

Optionally, the obtaining module 1201 is further configured to receive a gravity direction that is of the terminal device during photographing of the target image and that is sent by the terminal device. The determining module 1202 is specifically configured to determine the pose information based on the first pixel position, the third position information, and the gravity direction.

Optionally, the determining module 1202 is specifically configured to:

determine a 2D-3D correspondence between the first pixel position and the third position information; and determine the pose information based on the 2D-3D correspondence.

This disclosure further provides a pose determining apparatus. The pose determining apparatus may be a server. Refer to FIG. 12. FIG. 12 is a schematic diagram of a structure of a pose determining apparatus according to an embodiment of this disclosure. As shown in FIG. 12, the pose determining apparatus includes:

an obtaining module 1201, configured to: obtain a first pixel position that is of a circumscribed pattern of a target parking space mark and that is in a target image, where the target image includes the target parking space mark; and obtain third position information corresponding to the circumscribed pattern in a digital map, where the third position information indicates a coordinate position of the circumscribed pattern in the digital map; and a determining module 1202, configured to determine pose information based on the first pixel position and the third position information.

Optionally, the obtaining a first pixel position that is of a circumscribed pattern of a target parking space mark and that is in a target image includes:

receiving the target image sent by a terminal device; and determining the first pixel position that is of the circumscribed pattern of the target parking space mark and that is in the target image.

Optionally, the obtaining a first pixel position that is of a circumscribed pattern of a target parking space mark and that is in a target image includes:

receiving the first pixel position that is of the circumscribed pattern of the target parking space mark, that is in the target image, and that is sent by the terminal device.

Optionally, the obtaining third position information corresponding to the circumscribed pattern in a digital map includes:

receiving the target image or the target parking space mark sent by the terminal device; and determining, from the digital map, third position information corresponding to the circumscribed pattern in the digital map.

Optionally, the obtaining third position information corresponding to the circumscribed pattern in a digital map includes:

receiving the third position information that corresponds to the circumscribed pattern in the digital map and that is sent by the terminal device.

Optionally, the circumscribed pattern includes a first edge line, a second edge line, and a third edge line. At least two of the first edge line, the second edge line, and the third edge line are not parallel in the digital map, and a second corner point is an intersection point of the first edge line and the second edge line.

The first pixel position includes direction information of the first edge line, the second edge line, and the third edge line in the target image, and the third position information includes preset directions corresponding to the first edge line, the second edge line, and the third edge line in the digital map; or the first pixel position includes direction information of the first edge line and the second edge line in the target image, and a pixel position of the second corner point in the target image; and the third position information includes preset directions corresponding to the first edge line and the second edge line in the digital map, and a preset position corresponding to the second corner point in the digital map.

Optionally, the determining pose information based on the first pixel position and the third position information includes:

determining a 2D-3D correspondence between the first pixel position and the third position information; and determining the pose information based on the 2D-3D correspondence.

Optionally, the circumscribed pattern includes a circumscribed rectangular frame.

Figure 13:
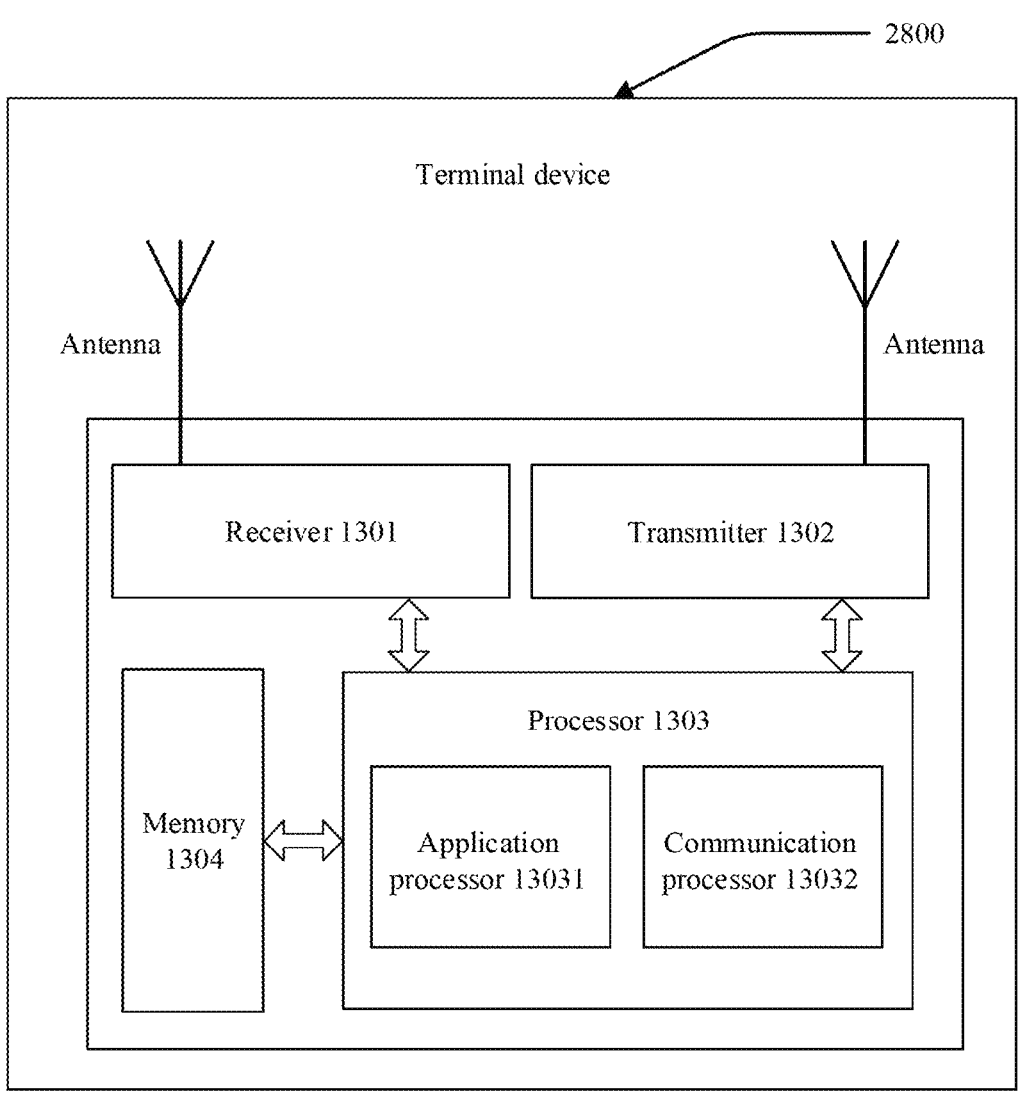
FIG. 13 is a schematic diagram of a structure of a terminal device according to an embodiment of this disclosure.

The following describes a terminal device provided in an embodiment of this disclosure. The terminal device may be the pose determining apparatus in FIG. 11. Refer to FIG. 13. FIG. 13 is a schematic diagram of a structure of a terminal device according to an embodiment of this disclosure. The terminal device 1300 may be specifically a virtual reality VR device, a mobile phone, a tablet computer, a notebook computer, an intelligent wearable device, or the like. This is not limited herein. Specifically, the terminal device 1300 includes a receiver 1301, a transmitter 1302, a processor 1303, and a memory 1304 (there may be one or more processors 1303 in the terminal device 1300, and one processor is used as an example in FIG. 13.) The processor 1303 may include an application processor 13031 and a communication processor 13032. In some embodiments of this disclosure, the receiver 1301, the transmitter 1302, the processor 1303, and the memory 1304 may be connected through a bus or in another manner.

The memory 1304 may include a read-only memory and a random access memory, and provide instructions and data for the processor 1303. A part of the memory 1304 may further include a non-volatile random access memory (NVRAM). The memory 1304 stores a processor and operation instructions, an executable module or a data structure, a subnet thereof, or an extended set thereof. The operation instructions may include various operation instructions to implement various operations.

The processor 1303 controls an operation of the terminal device. In a specific application, components of the terminal device are coupled together by using a bus system. In addition to a data bus, the bus system may further include a power bus, a control bus, a status signal bus, and the like. However, for clear description, various types of buses in the figure are marked as the bus system.

The method disclosed in the foregoing embodiments of this disclosure may be applied to the processor 1303, or may be implemented by the processor 1303. The processor 1303 may be an integrated circuit chip, and has a signal processing capability. In an implementation process, the steps in the foregoing methods may be implemented by using a hardware integrated logical circuit in the processor 1303, or by using instructions in a form of software. The processor 1303 may be a general-purpose processor, a digital signal processor (DSP), a microprocessor, or a microcontroller; or may include an application-specific integrated circuit (ASIC), a field-programmable gate array (FPGA) or another programmable logic device, a discrete gate or transistor logic device, or a discrete hardware component. The processor 1303 may implement or perform the methods, steps, and logic block diagrams disclosed in embodiments of this disclosure. The general-purpose processor may be a microprocessor, or the processor may be any conventional processor or the like. The steps in the methods disclosed with reference to embodiments of this disclosure may be directly executed and accomplished by using a hardware decoding processor, or may be executed and accomplished by using a combination of hardware and software modules in a decoding processor. The software module may be located in a storage medium mature in the art, such as a random access memory, a flash memory, a read-only memory, a programmable read-only memory, an electrically erasable programmable memory, or a register. The storage medium is located in the memory 1304, and the processor 1303 reads information in the memory 1304 and completes the steps in the foregoing methods in combination with hardware in the processor 1303.

The receiver 1301 may be configured to receive input digital or character information, and generate signal input related to a related setting and function control of the terminal device. The transmitter 1302 may be configured to output digital or character information through a first interface. The transmitter 1302 may be further configured to send instructions to a disk group through the first interface, to modify data in the disk group. The transmitter 1302 may further include a display device such as a display.

In this embodiment of this disclosure, in one case, the processor 1303 is configured to:

obtain a target image, where the target image includes a target parking space mark and a target parking space line, and a target parking space corresponding to the target parking space mark includes the target parking space line; and determine pose information based on the target parking space mark and the target parking space line, where the target image is photographed by the terminal device, and the pose information indicates a corresponding pose of the terminal during photographing of the target image.

Optionally, the determining pose information based on the target parking space mark and the target parking space line includes:

obtaining a first pixel position of the target parking space line in the target image;

obtaining third position information corresponding to the target parking space line in a digital map, where the third position information indicates a coordinate position of the target parking space line in the digital map; and determining the pose information based on the first pixel position and the third position information.

Optionally, the determining pose information based on the target parking space mark and the target parking space line includes:

sending the target image to a server; and receiving the pose information sent by the server, where the pose information is determined by the server based on a first pixel position of the target parking space line in the target image and third position information corresponding to the target parking space line in a digital map.

Optionally, the determining pose information based on the target parking space mark and the target parking space line includes:

obtaining a first pixel position of the target parking space line in the target image;

sending the target parking space mark and the first pixel position to a server; and receiving the pose information sent by the server, where the pose information is determined by the server based on the first pixel position and third position information corresponding to the target parking space line in a digital map.

Optionally, the determining pose information based on the target parking space mark and the target parking space line includes:

obtaining third position information corresponding to the target parking space line in a digital map, where the third position information indicates position information of the target parking space line in the digital map;

sending the target image and the third position information to a server; and receiving the pose information sent by the server, where the pose information is determined by the server based on the third position information and a first pixel position of the target parking space line in the target image.

Optionally, the obtaining a target image includes:

displaying a target photographing interface, where the target photographing interface includes a photographing area, and the photographing area includes a preset guide contour; and obtaining, through photographing, the target image if the target parking space in the photographing area is located within the preset guide contour or a position difference between a target parking space in the photographing area and the preset guide contour falls within a preset range.

The obtaining a first pixel position of the target parking space line in the target image includes: obtaining a pixel position of the preset guide contour in the target image.

Optionally, before the determining pose information based on the target parking space mark and the target parking space line, the method further includes:

displaying a parking space mark input indication box; and obtaining the target parking space mark input in the parking space mark input indication box.

Optionally, the pose information includes a coordinate position of the terminal device during photographing of the target image.

The method further includes:

performing route planning based on the coordinate position to obtain a planned route, where a start point or an end point of the planned route is the coordinate position; and displaying a two-dimensional navigation interface, where the two-dimensional navigation interface includes the planned route.

Optionally, the pose information includes a coordinate position, a yaw angle, a pitch angle, and a roll angle of the terminal device during photographing of the target image. The method further includes:

displaying an AR navigation interface, where the AR navigation interface includes a navigation guidance and an image of an environment including the current terminal device, and the navigation guidance is determined based on the coordinate position, the yaw angle, the pitch angle, and the roll angle of the terminal device.

Optionally, the obtaining third position information corresponding to the target parking space line in a digital map includes:

obtaining positioning information of the terminal device during photographing of the target image; and obtaining, from the digital map, the third position information that matches the positioning information and that corresponds to the target parking space line in the digital map.

Optionally, the target parking space line includes a first parking space line, a second parking space line, and a third parking space line. At least two of the first parking space line, the second parking space line, and the third parking space line are not parallel in the digital map, and a first corner point is an intersection point of the first parking space line and the second parking space line.

The first pixel position includes direction information of the first parking space line, the second parking space line, and the third parking space line in the target image, and the third position information includes preset directions corresponding to the first parking space line, the second parking space line, and the third parking space line in the digital map; or the first pixel position includes direction information of the first parking space line and the second parking space line in the target image, and a pixel position of the first corner point in the target image; and the third position information includes preset directions corresponding to the first parking space line and the second parking space line in the digital map, and a preset position corresponding to the first corner point in the digital map.

Optionally, the determining pose information based on the first pixel position and the third position information includes:

obtaining a gravity direction of the terminal device during photographing of the target image; and determining the pose information based on the first pixel position, the third position information, and the gravity direction.

Optionally, the determining pose information based on the first pixel position and the third position information includes:

determining a 2D-3D correspondence between the first pixel position and the third position information; and determining the pose information based on the 2D-3D correspondence.

The terminal device may alternatively perform the following steps:

obtaining a target image, where the target image includes a target parking space mark; and determining pose information based on the target parking space mark and a first pixel position that is of a circumscribed pattern of the target parking space mark and that is in the target image, where the target image is photographed by a terminal, and the pose information indicates a corresponding pose of the terminal during photographing of the target image.

Optionally, the determining pose information based on the target parking space mark and a first pixel position that is of a circumscribed pattern of the target parking space mark and that is in the target image includes:

obtaining the first pixel position that is of the circumscribed pattern of the target parking space mark and that is in the target image;

obtaining third position information corresponding to the target parking space line in a digital map, where the third position information indicates position information that is of the circumscribed pattern of the target parking space mark and that is in the digital map; and determining the pose information based on the first pixel position and the third position information.

Optionally, the determining pose information based on the target parking space mark and a first pixel position that is of a circumscribed pattern of the target parking space mark and that is in the target image includes:

sending the target image to a server; and receiving the pose information sent by the server, where the pose information is determined by the server based on the first pixel position that is of the circumscribed pattern of the target parking space mark and that is in the target image, and third position information corresponding to the target circumscribed pattern in a digital map; and the third position information indicates position information that is of the circumscribed pattern of the target parking space mark and that is in the digital map.

Optionally, the determining pose information based on the target parking space mark and a first pixel position that is of a circumscribed pattern of the target parking space mark and that is in the target image includes:

obtaining the first pixel position that is of the circumscribed pattern of the target parking space mark and that is in the target image;

sending the target parking space mark and the first pixel position to a server; and receiving the pose information sent by the server, where the pose information is determined by the server based on the first pixel position and third position information corresponding to the circumscribed pattern in the digital map.

Optionally, the determining pose information based on the target parking space mark and a first pixel position that is of a circumscribed pattern of the target parking space mark and that is in the target image includes:

obtaining third position information corresponding to the circumscribed pattern in a digital map, where the third position information indicates position information that is of the circumscribed pattern of the target parking space mark and that is in the digital map;

sending the target image and the third position information to a server; and receiving the pose information sent by the server, where the pose information is determined by the server based on the second position information and the first pixel position that is of the circumscribed pattern of the target parking space mark and that is in the target image.

Optionally, the method further includes:

displaying a parking space mark input indication box; and obtaining the target parking space mark input in the parking space mark input indication box.

Optionally, the pose information includes a coordinate position of the terminal device during photographing of the target image.

The method further includes:

performing route planning based on the coordinate position to obtain a planned route, where a start point or an end point of the planned route is the coordinate position; and displaying a two-dimensional navigation interface, where the two-dimensional navigation interface includes the planned route.

Optionally, the pose information includes a coordinate position, a yaw angle, a pitch angle, and a roll angle of the terminal device during photographing of the target image. The method further includes:

displaying an AR navigation interface, where the AR navigation interface includes a navigation guidance and an image of an environment including the current terminal device, and the navigation guidance is determined based on the coordinate position, the yaw angle, the pitch angle, and the roll angle of the terminal device.

Optionally, the method further includes:

obtaining positioning information of the terminal device during photographing of the target image; and the obtaining third position information corresponding to the circumscribed pattern in a digital map includes: obtaining, from the digital map, the third position information that corresponds to the circumscribed pattern matching the positioning information.

Optionally, the circumscribed pattern includes a first edge line, a second edge line, and a third edge line. At least two of the first edge line, the second edge line, and the third edge line are not parallel in the digital map, and a second corner point is an intersection point of the first edge line and the second edge line.

The first pixel position includes direction information of the first edge line, the second edge line, and the third edge line in the target image, and the third position information includes preset directions corresponding to the first edge line, the second edge line, and the third edge line in the digital map; or the first pixel position includes direction information of the first edge line and the second edge line in the target image, and a pixel position of the second corner point in the target image; and the third position information includes preset directions corresponding to the first edge line and the second edge line in the digital map, and a preset position corresponding to the second corner point in the digital map.

Optionally, the determining pose information based on the first pixel position and the third position information includes:

determining a 2D-3D correspondence between the first pixel position and the third position information; and determining the pose information based on the 2D-3D correspondence.

Optionally, the circumscribed pattern includes a circumscribed rectangular frame.

Figure 14:
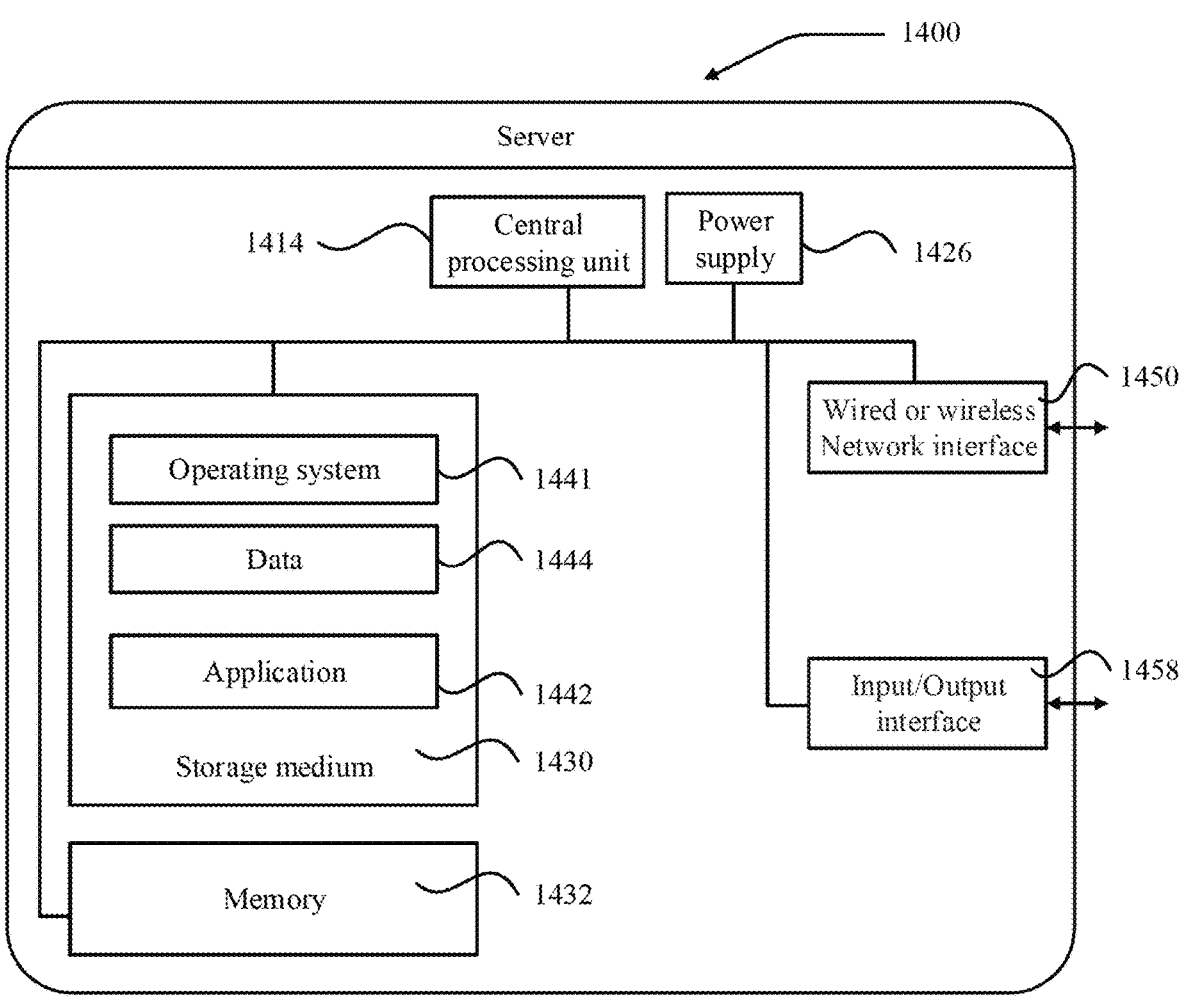
FIG. 14 is a schematic diagram of a structure of a server according to an embodiment of this disclosure.

An embodiment of this disclosure further provides a server. Refer to FIG. 14. FIG. 14 is a schematic diagram of a structure of a server according to an embodiment of this disclosure. Specifically, the server 1400 may vary greatly due to different configurations or performance, and may include one or more central processing units (CPU) 1414 (for example, one or more processors) and a memory 1432, and one or more storage media 1430 (for example, one or more mass storage devices) that stores an application 1442 or data 1444. The memory 1432 and the storage medium 1430 may be transient storage or persistent storage. A program stored in the storage medium 1430 may include one or more modules (not shown in the figure), and each module may operate a series of instructions of the server. Further, the central processing unit 1414 may be set to communicate with the storage medium 1430, and executes, on the server 1400, a series of instruction operations in the storage medium 1430.

The server 1400 may further include one or more power supplies 1426, one or more wired or wireless network interfaces 1450, one or more input/output interfaces 1458; and/or one or more operating systems 1441, for example, Windows Server™, Mac OS X™, Unix™, Linux™, and FreeBSD™.

In this embodiment of this disclosure, the central processing unit 1414 is configured to obtain a first pixel position that is of a circumscribed pattern of a target parking space mark and that is in a target image, where the target image includes the target parking space mark; and obtaining third position information corresponding to the circumscribed pattern in a digital map, where the third position information indicates a coordinate position of the circumscribed pattern in the digital map; and determining the pose information based on the first pixel position and the third position information.

Optionally, the obtaining a first pixel position that is of a circumscribed pattern of a target parking space mark and that is in a target image includes:

receiving the target image sent by a terminal device; and determining the first pixel position that is of the circumscribed pattern of the target parking space mark and that is in the target image.

Optionally, the obtaining a first pixel position that is of a circumscribed pattern of a target parking space mark and that is in a target image includes:

receiving the first pixel position that is of the circumscribed pattern of the target parking space mark, that is in the target image, and that is sent by the terminal device.

Optionally, the obtaining third position information corresponding to the circumscribed pattern in a digital map includes:

receiving the target image or the target parking space mark sent by the terminal device; and determining, from the digital map, third position information corresponding to the circumscribed pattern in the digital map.

Optionally, the obtaining third position information corresponding to the circumscribed pattern in a digital map includes:

receiving the third position information that corresponds to the circumscribed pattern in the digital map and that is sent by the terminal device.

Optionally, the circumscribed pattern includes a first edge line, a second edge line, and a third edge line. At least two of the first edge line, the second edge line, and the third edge line are not parallel in the digital map, and a second corner point is an intersection point of the first edge line and the second edge line.

The first pixel position includes direction information of the first edge line, the second edge line, and the third edge line in the target image, and the third position information includes preset directions corresponding to the first edge line, the second edge line, and the third edge line in the digital map; or the first pixel position includes direction information of the first edge line and the second edge line in the target image, and a pixel position of the second corner point in the target image; and the third position information includes preset directions corresponding to the first edge line and the second edge line in the digital map, and a preset position corresponding to the second corner point in the digital map.

Optionally, the determining pose information based on the first pixel position and the third position information includes:

determining a 2D-3D correspondence between the first pixel position and the third position information; and determining the pose information based on the 2D-3D correspondence.

Optionally, the circumscribed pattern includes a circumscribed rectangular frame.

An embodiment of this disclosure further provides a computer program product. When the computer program product is run on a computer, the computer is enabled to perform the steps in the pose determining method.

An embodiment of this disclosure further provides a computer-readable storage medium. The computer-readable storage medium stores a program for signal processing. When the program is run on a computer, the computer is enabled to perform the steps in the pose determining method in the foregoing method embodiments.

In addition, it should be noted that the described apparatus embodiments are merely examples. The units described as separate parts may or may not be physically separate, and parts displayed as units may or may not be physical units, may be located in one position, or may be distributed on a plurality of network units. A part or all of the modules may be selected according to an actual requirement to achieve the objectives of the solutions of embodiments. In addition, in the accompanying drawings of the apparatus embodiments provided in this disclosure, connection relationships between modules indicate that the modules have communication connections with each other, which may be specifically implemented as one or more communications buses or signal cables.

Based on the description of the foregoing implementations, a person skilled in the art may clearly understand that this disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this disclosure, software program implementation is a better implementation in most cases. Based on such an understanding, the technical solutions in this disclosure essentially or the part contributing to the prior art may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the method in embodiments of this disclosure.

All or a part of the foregoing embodiments may be implemented by software, hardware, firmware, or any combination thereof. When software is used to implement embodiments, all or a part of embodiments may be implemented in a form of a computer program product.

The computer program product includes one or more computer instructions. When the computer program instructions are loaded and executed on a computer, all or a part of the procedures or functions according to embodiments of this disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A pose determining method comprising:
obtaining a target image, wherein the target image comprises a target parking space mark and a target parking space line, and a target parking space corresponding to the target parking space mark comprises the target parking space line;
recognizing the target parking space mark in the target image by using optical character recognition; and
determining pose information based on the target parking space mark and the target parking space line, wherein the pose information indicates a corresponding pose of a terminal during photographing of the target image; wherein
the determining of the pose information based on the target parking space mark and the target parking space line comprises:
obtaining a pixel position of the target parking space line in the target image;
obtaining position information corresponding to the target parking space line in a digital map, wherein the position information indicates a position of the target parking space line in the digital map; and
determining the pose information based on the pixel position and the position information, and the position information includes a preset position of a corner point of a circumscribed frame of the target parking space mark.

2. The method according to claim 1, wherein the determining of the pose information based on the target parking space mark and the target parking space line further comprises:
sending the target image to a server; and
receiving the pose information sent by the server, wherein the pose information is determined by the server based on the pixel position of the target parking space line in the target image and the position information corresponding to the target parking space line in the digital map, and the position information indicates a position of the target parking space line in the digital map.

3. The method according to claim 1, wherein the determining of the pose information based on the target parking space mark and the target parking space line further comprises:
sending the target parking space mark and the pixel position to a server; and
receiving the pose information sent by the server, wherein the pose information is determined by the server based on the pixel position and the position information corresponding to the target parking space line in the digital map, and the position information indicates a position of the target parking space line in the digital map.

4. The method according to claim 1, wherein the determining of the pose information based on the target parking space mark and the target parking space line further comprises:
sending the target image and the position information to a server; and
receiving the pose information sent by the server, wherein the pose information is determined by the server based on the position information and the pixel position of the target parking space line in the target image.

5. The method according to claim 1, wherein the obtaining of the target image comprises:

displaying a target photographing interface, wherein the target photographing interface comprises a photographing area, and the photographing area comprises a preset guide contour; and obtaining, through photographing, the target image if the target parking space in the photographing area is located within the preset guide contour or a position difference between a target parking space in the photographing area and the preset guide contour falls within a preset range.

6. The method according to claim 1, wherein before the determining of the pose information based on the target parking space mark and the target parking space line, the method further comprises:

displaying a parking space mark input indication box in the target image; and obtaining the target parking space mark input in the parking space mark input indication box.

7. The method according to claim 1, wherein the obtaining of the position information corresponding to the target parking space line in the digital map comprises:

obtaining positioning information of the terminal device during photographing of the target image; and obtaining, from the digital map, the position information that matches the positioning information and that corresponds to the target parking space line in the digital map.

8. The method according to claim 1, wherein the target parking space line comprises a first parking space line, a second parking space line, and a third parking space line, wherein at least two of the first parking space line, the second parking space line, and the third parking space line are not parallel in the digital map, and a first corner point is an intersection point of the first parking space line and the second parking space line, wherein the pixel position comprises direction information of the first parking space line, the second parking space line, and the third parking space line in the target image, and the position information comprises preset directions corresponding to the first parking space line, the second parking space line, and the third parking space line in the digital map; or the pixel position comprises direction information of the first parking space line and the second parking space line in the target image, and a pixel position of the first corner point in the target image; and the position information comprises preset directions corresponding to the first parking space line and the second parking space line in the digital map, and a preset position corresponding to the first corner point in the digital map.

9. The method according to claim 1, further comprising performing processing based on the pose information in real time, the processing including at least one of navigation, route planning or obstacle avoidance.

10. A pose determining method comprising:

obtaining a pixel position that is of a circumscribed pattern of a target parking space mark and that is in a target image, wherein the target image comprises the target parking space mark and the circumscribed pattern defines an area in which the target parking space mark is located;

obtaining position information corresponding to the circumscribed pattern in a digital map, wherein the position information indicates a coordinate position of the circumscribed pattern in the digital map, wherein the digital map includes the circumscribed pattern and parking space lines; and determining pose information based on the pixel position and the position information, wherein the pose information indicates a corresponding pose of a terminal during photographing of the target image; wherein wherein the circumscribed pattern comprises a first edge line, a second edge line, and a third edge line, wherein at least two of the first edge line, the second edge line, and the third edge line are not parallel in the digital map, and a corner point is an intersection point of the first edge line and the second edge line; and the pixel position comprises direction information of the first edge line and the second edge line in the target image, and a pixel position of the second-corner point in the target image; and the position information comprises preset directions corresponding to the first edge line and the second edge line in the digital map, and a preset position corresponding to the corner point in the digital map.

11. The method according to claim 10, wherein the circumscribed pattern comprises a circumscribed rectangular frame.

12. The method according to claim 10, further comprising performing processing based on the pose information in real time, the processing including at least one of navigation, route planning or obstacle avoidance.

13. A pose determining apparatus comprising:

a processing system, including at least one computer processor, the processing system being at least configured to:

obtain a target image, wherein the target image comprises a target parking space mark and a target parking space line, and a target parking space corresponding to the target parking space mark comprises the target parking space line;

recognize the target parking space mark in the target image by using optical character recognition; and determine pose information based on the target parking space mark and the target parking space line, wherein the pose information indicates a corresponding pose of a terminal during photographing of the target image;

wherein in order to determine the pose information, the processing system is further configured to:

obtain a pixel position of the target parking space line in the target image;

obtain position information corresponding to the target parking space line in a digital map, wherein the position information indicates a position of the target parking space line in the digital map; and determine the pose information based on the pixel position and the position information, and the position information includes a preset position of a corner point of a circumscribed frame of the target parking space mark.

14. The apparatus according to claim 13, wherein in order to determine the pose information, the processing system is further configured to:

send the target image to a server; and receive the pose information sent by the server, wherein the pose information is determined by the server based on the pixel position of the target parking space line in the target image and the position information corresponding to the target parking space line in the digital map, and the position information indicates a position of the target parking space line in the digital map.

15. The apparatus according to claim 13, wherein in order to determine the pose information, the processing system is further configured to:

send the target parking space mark and the pixel position to a server; and receive the pose information sent by the server, wherein the pose information is determined by the server based on the pixel position and the position information corresponding to the target parking space line in the digital map, and the position information indicates a position of the target parking space line in the digital map.

16. The apparatus according to claim 13, wherein in order to determine the pose information, the processing system is further configured to:

send the target image and the position information to a server; and receive the pose information sent by the server, wherein the pose information is determined by the server based on the position information and the pixel position of the target parking space line in the target image.

17. The apparatus according to claim 13, wherein in order to obtain the target image, the processing system is further configured to:

display a target photographing interface, wherein the target photographing interface comprises a photographing area, and the photographing area comprises a preset guide contour; and obtain, through photographing, the target image if the target parking space in the photographing area is located within the preset guide contour or a position difference between a target parking space in the photographing area and the preset guide contour falls within a preset range.

18. The apparatus according to claim 13, wherein the processing system is further configured to:

display a parking space mark input indication box in the target image; and obtain the target parking space mark input in the parking space mark input indication box.

19. The apparatus according to claim 13, wherein the target parking space line comprises a first parking space line, a second parking space line, and a third parking space line, wherein at least two of the first parking space line, the second parking space line, and the third parking space line are not parallel in the digital map, and a first corner point is an intersection point of the first parking space line and the second parking space line, wherein the pixel position comprises direction information of the first parking space line, the second parking space line, and the third parking space line in the target image, and the position information comprises preset directions corresponding to the first parking space line, the second parking space line, and the third parking space line in the digital map; or the pixel position comprises direction information of the first parking space line and the second parking space line in the target image, and a pixel position of the first corner point in the target image; and the position information comprises preset directions corresponding to the first parking space line and the second parking space line in the digital map, and a preset position corresponding to the first corner point in the digital map.

20. The apparatus according to claim 13, the processing system is further configured to perform processing based on the pose information in real time, the processing including at least one of navigation, route planning or obstacle avoidance.

* * * * *